United States Patent
Teeter et al.

(10) Patent No.: US 11,011,288 B1
(45) Date of Patent: May 18, 2021

(54) HYBRID ELECTRICAL/OPTICAL DATA/POWER CABLING SYSTEM

(71) Applicant: Dell Products L.P., Round Rock, TX (US)

(72) Inventors: Victor Teeter, Round Rock, TX (US); Shree Rathinasamy, Round Rock, TX (US); Robert Neal Beard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/929,654

(22) Filed: May 14, 2020

(51) Int. Cl.
  *H01B 11/22* (2006.01)
  *H04B 10/40* (2013.01)
  *H01B 9/00* (2006.01)
(52) U.S. Cl.
  CPC ............ *H01B 11/22* (2013.01); *H01B 9/005* (2013.01); *H04B 10/40* (2013.01)
(58) Field of Classification Search
  CPC .................................................. G02B 6/4293
  See application file for complete search history.

(56) References Cited

U.S. PATENT DOCUMENTS

| | | | | |
|---|---|---|---|---|
| 8,577,195 | B2* | 11/2013 | Terlizzi | G02B 6/3817 |
| | | | | 385/101 |
| 10,146,022 | B1* | 12/2018 | Beard | H04N 21/615 |
| 10,502,910 | B2* | 12/2019 | Leigh | G02B 6/4245 |
| 2015/0378118 | A1* | 12/2015 | Huegerich | G02B 6/4416 |
| | | | | 385/89 |

* cited by examiner

*Primary Examiner* — Omar R Rojas
(74) *Attorney, Agent, or Firm* — Haynes and Boone, LLP

(57) ABSTRACT

A hybrid electrical/optical data/power cabling system includes a hybrid electrical/optical data/power transceiver device connected to a computing device. The hybrid electrical/optical data/power transceiver device includes a power transmission element that receives power and transmits the power to a first power transmission layer included in a hybrid electrical/optical data/power cable connected to the hybrid electrical/optical data/power transceiver device. The hybrid electrical/optical data/power transceiver device also includes optical data signal transmission element that transmits optical data signals to a first optical data signal transmission layer in the hybrid electrical/optical data/power cable connected to the hybrid electrical/optical data/power transceiver device. An electrical/optical data signal conversation subsystem in the hybrid electrical/optical data/power transceiver device receives and converts electrical data signals to optical data signals that it provides to the optical data signal transmission element for transmission to the first optical data signal transmission layer in the hybrid electrical/optical data/power cable.

17 Claims, 24 Drawing Sheets

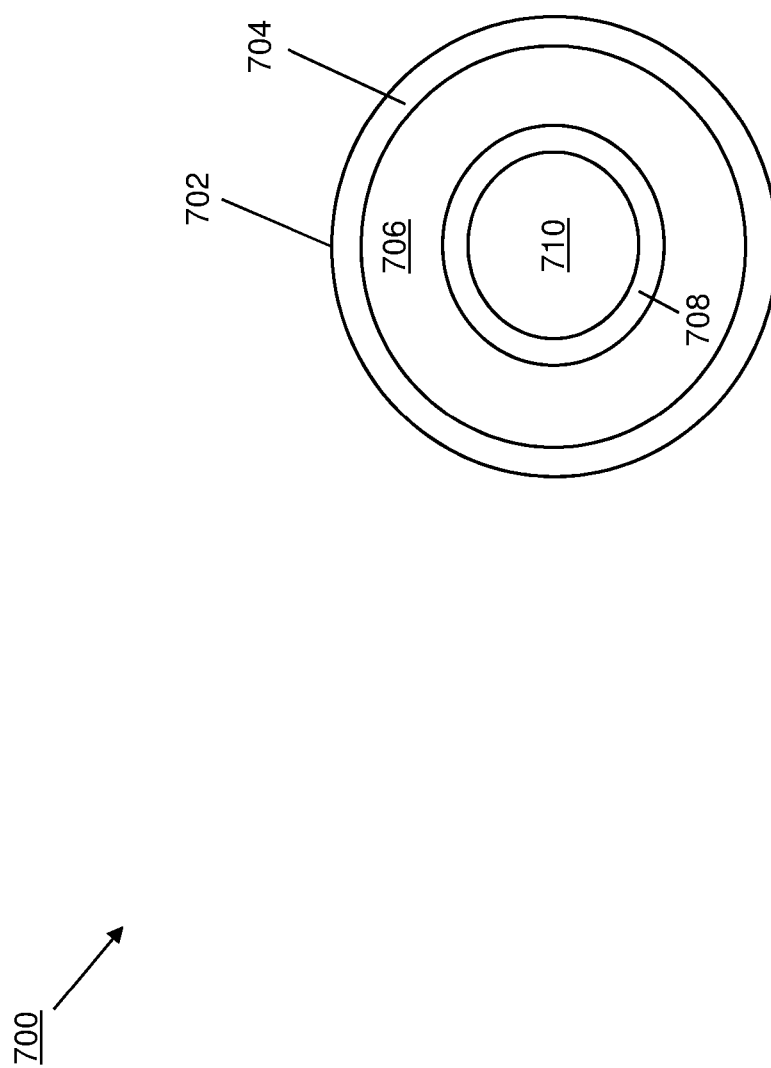

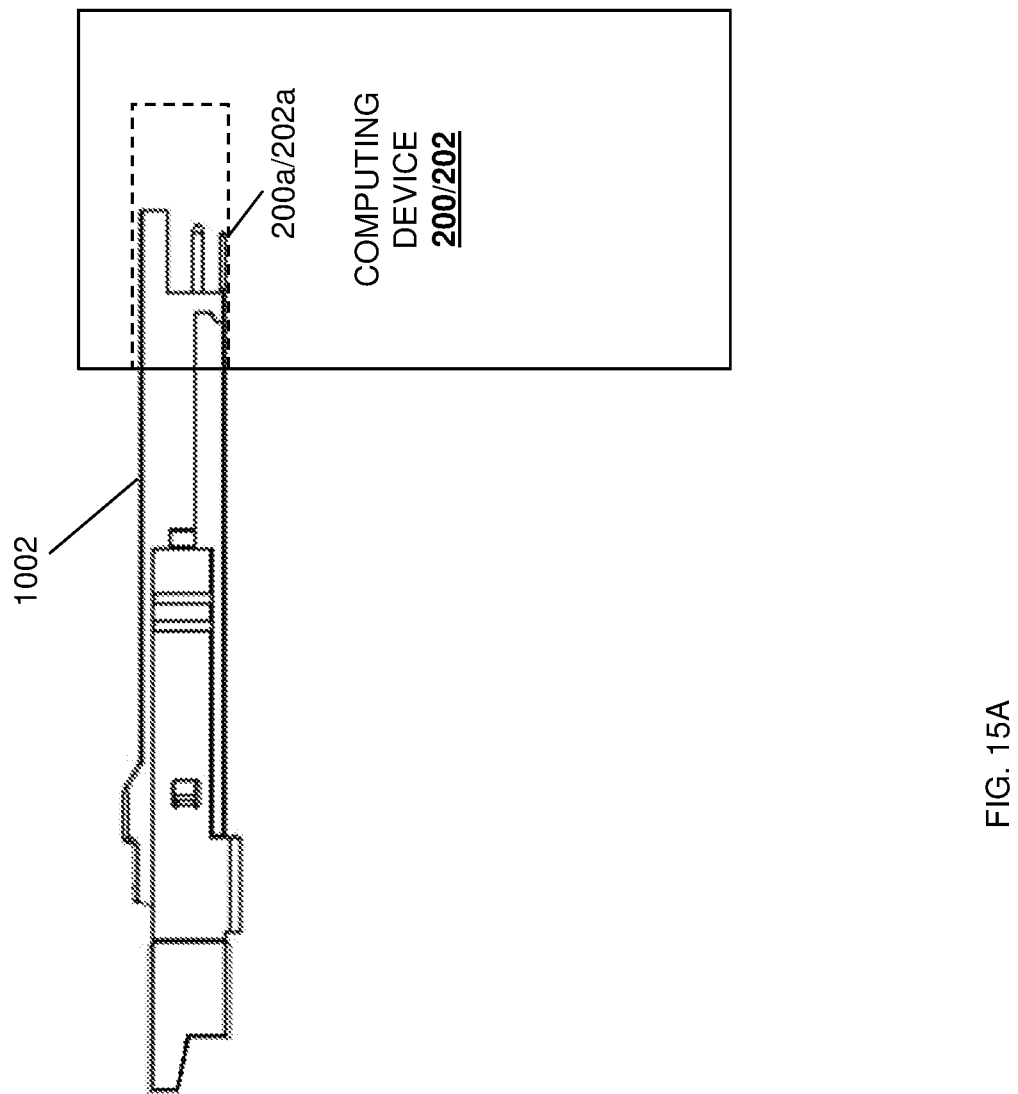

HYBRID ELECTRICAL/OPTICAL DATA/POWER CABLING SYSTEM

BACKGROUND

The present disclosure relates generally to information handling systems, and more particularly to a hybrid electrical/optical cabling system used to connect information handling systems and transmit data and power between those information handling systems via a single cable.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometimes utilize data/power cabling systems in order to transmit power and data between devices using a single cable. For example, Power over Ethernet (PoE) cabling systems may operate to pass electrical power along with electrical data signals on a twisted pair Ethernet cable that is connected to a Power Sourcing Equipment (PSE) device (e.g., a switch device or other networking device known in the art) and Powered Device (PD) (e.g., a camera, an access point, an Internet of things (IoT) device, a card reader device, etc.) However, each generation of PDs has steadily increased their data transmission bandwidth requirements, and this trend is expected to continue into the future. For example, conventional Ethernet cabling (e.g., Cat5, Cat6, and Cat7) is capable of providing a maximum data transmission throughput of 1 Gigabit Ethernet (GbE), which has been sufficient for PDs up to this point. However, as data transmission bandwidth requirements increase (e.g., in order to allow for high definition video streams from high definition camera, associated audio streams, etc.), conventional Ethernet cabling utilized with PoE systems will eventually become obsolete and unable to support those data transmission bandwidth requirements.

Accordingly, it would be desirable to provide a data/power cabling system that addresses the issues discussed above.

SUMMARY

According to one embodiment, an Information Handling System (IHS) includes a processing system; a port that is coupled to the processing system; a hybrid electrical/optical data/power transceiver device that is connected to the port; a hybrid electrical/optical data/power connector on the hybrid electrical/optical data/power transceiver device that includes a first hybrid electrical/optical data/power transmission wire connector element having: a first power transmission element that is configured to receive power via the port and transmit the power to a first power transmission layer in a first hybrid electrical/optical data/power wire included in a hybrid electrical/optical data/power cable that is connected to the hybrid electrical/optical data/power connector; and a first optical data signal transmission element that is configured to transmit optical data signals to a first optical data signal transmission layer in the first hybrid electrical/optical data/power wire included in the hybrid electrical/optical data/power cable that is connected to the hybrid electrical/optical data/power connector; and an electrical/optical data signal conversation subsystem that is included in the hybrid electrical/optical data/power transceiver device and that is configured to: receive electrical data signals from the processing system via the port; convert the electrical data signals to optical data signals; and provide the optical data signals to the first optical data signal element for transmission to the first optical data signal transmission layer in the first hybrid electrical/optical data/power wire included in the hybrid electrical/optical data/power cable that is connected to the hybrid electrical/optical data/power connector.

BRIEF DESCRIPTION OF THE DRAWINGS

FIG. 7B is a front cross-sectional view illustrating an embodiment of a hybrid electrical/optical data/power wire that may be provided in the hybrid electrical/optical data/power cable of FIG. 4.

FIG. 15A is a schematic view illustrating an embodiment of the hybrid electrical/optical data/power transceiver device of FIGS. 10A-10C connected to one of the computing devices of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
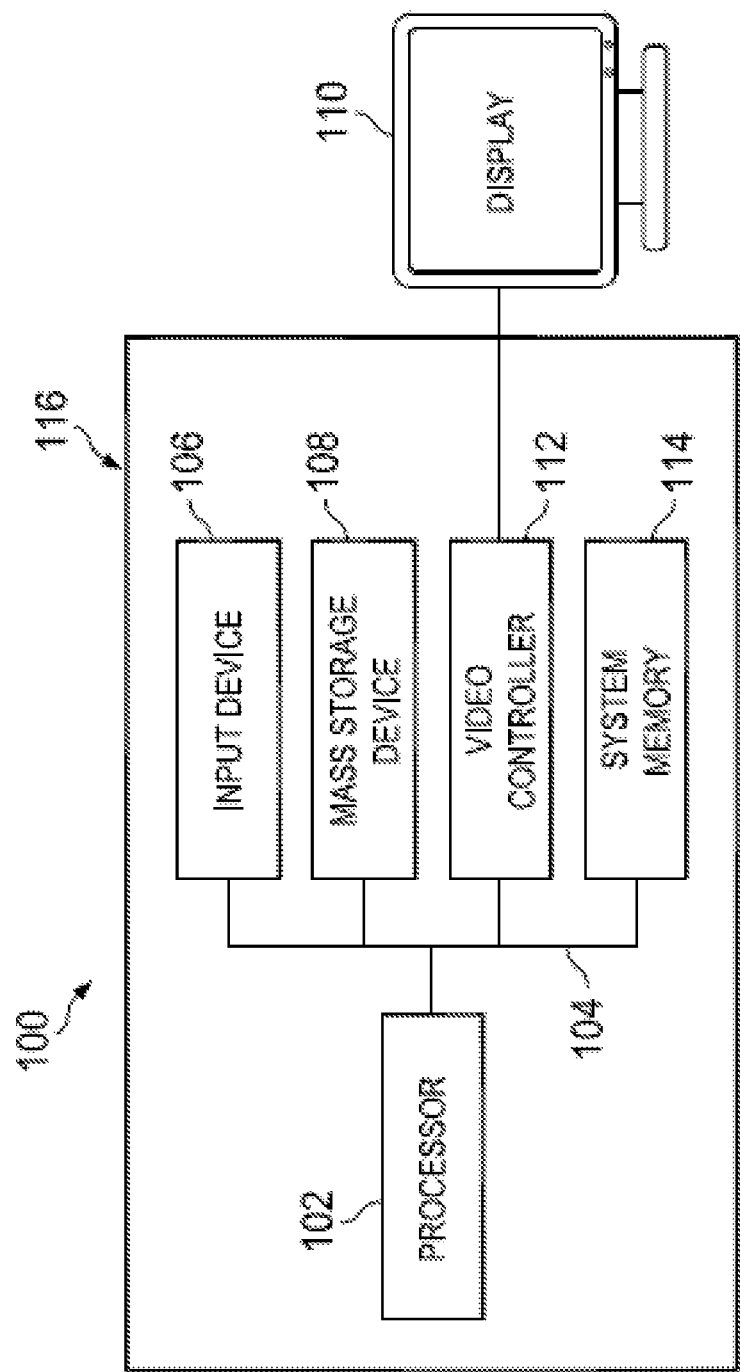
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
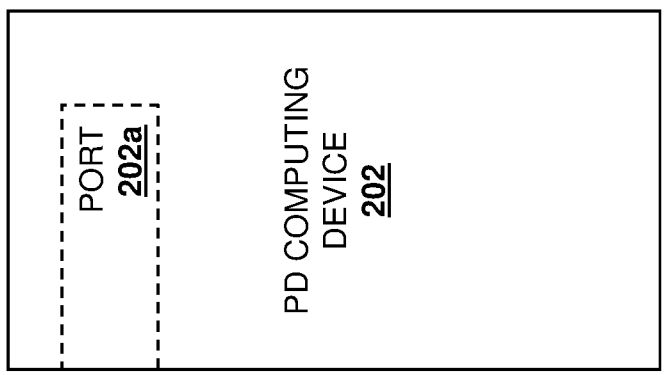
FIG. 2 is a schematic view illustrating an embodiment of computing devices that may be connected using the hybrid electrical/optical data/power cabling system of the present disclosure.
Figure 2:
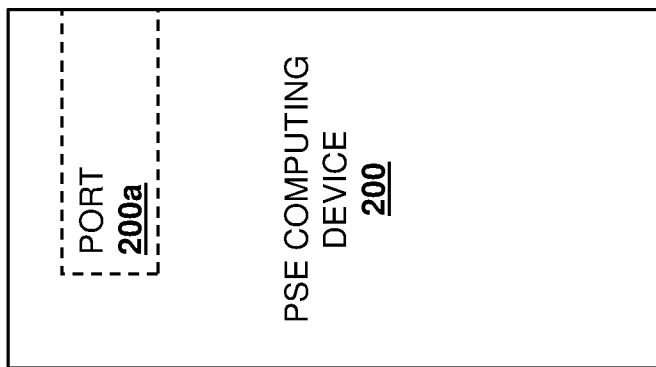

Referring now to FIG. 2, an embodiment of computing devices that may be connected using the hybrid electrical/optical data/power cabling system of the present disclosure is illustrated. In the examples illustrated and discussed below, the hybrid electrical/optical data/power cabling system of the present disclosure is used with a Power Sourcing Equipment (PSE) computing device 200 that includes a port 200a. For example, the PSE computing device 200 may be provided by the IHS 100 discussed above with reference to FIG. 1, and/or may include some or all of the components of the IHS 100, and in specific examples may be provided by a switch device and/or other networking device known in the art. However, while illustrated and discussed as a switch device, one of skill in the art in possession of the present disclosure will recognize that the PSE computing device 200 may include any devices that may be configured to operate similarly as the PSE computing device 200 discussed below.

In the embodiment illustrated and discussed below, the hybrid electrical/optical data/power cabling system is also used with a Powered Device (PD) computing device 202 that includes a port 202a. For example, the PD computing device 202 may be provided by the IHS 100 discussed above with reference to FIG. 1, and/or may include some or all of the components of the IHS 100, and in specific examples may be provided by a camera device, an access point, an IoT device, a card reader device, and/or any other PD computing device that would be apparent to one of skill in the art in possession of the present disclosure. However, while illustrated and discussed as being provided by a few specific powered devices, one of skill in the art in possession of the present disclosure will recognize that the PD computing device 202 may include any devices that may be configured to operate similarly as the PD computing device 202 discussed below. In the examples discussed below, the PSE computing device 200 may be configured to transmit data along with power to the PD computing device 202 using the hybrid electrical/optical data/power cabling system of the present disclosure, and the PD computing device 202 may be configured to transmit data back to the PSE computing device 200 using the hybrid electrical/optical data/power cabling system of the present disclosure. However, one of skill in the art in possession of the present disclosure will appreciate that other uses of the hybrid electrical/optical data/power cabling system of the present disclosure will fall within the scope of the present disclosure as well.

Figure 3A:
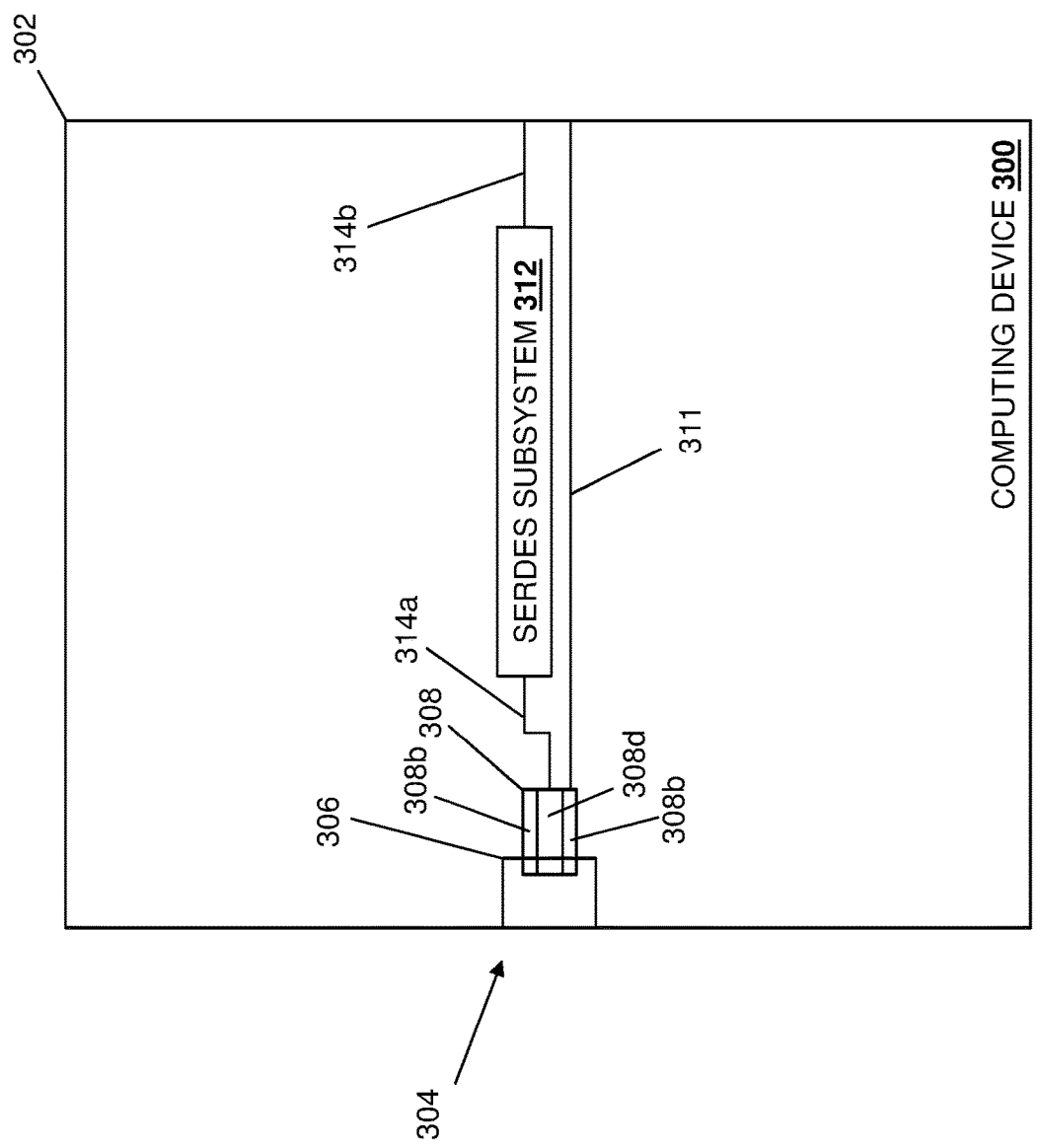
FIG. 3A is a schematic view illustrating an embodiment of a computing device that may be connected via the hybrid electrical/optical data/power cabling system of the present disclosure.
Figure 3B:
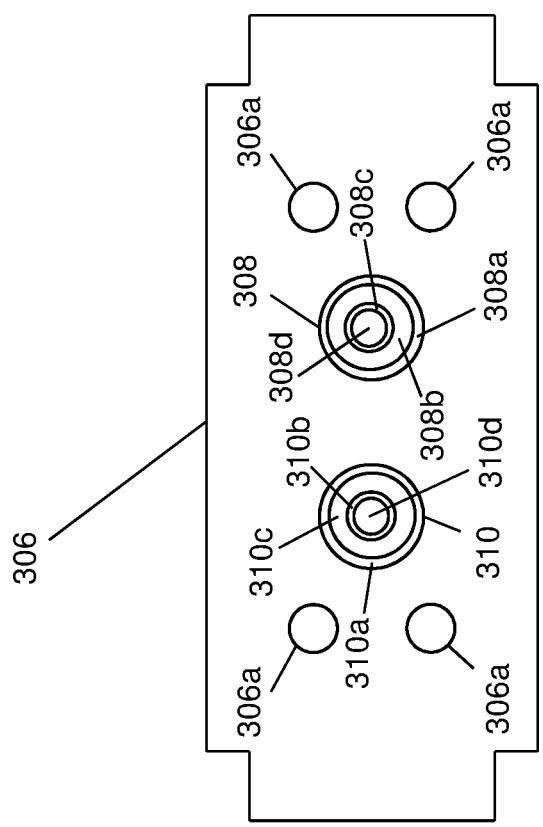
FIG. 3B is a schematic view illustrating an embodiment of a hybrid electrical/optical data/power cable connector that may be provided on the computing device of FIG. 3A.

Referring now to FIGS. 3A and 3B, an embodiment of a computing device 300 is illustrated that may provide either (or both) of the PSE computing device 200 and the PD computing device 202 discussed above with reference to FIG. 2 in some embodiments of the present disclosure. As such, the computing device 300 may be provided by the IHS 100 discussed above with reference to FIG. 1 and/or may include some or all of the components of the IHS 100, and in specific examples may be a switch device or other networking device when provided as the PSE computing device 200, while being a camera device, an access point, an IoT device, a card reader device, and/or any other PD computing device known in the art when provided as the PD computing device 202. Furthermore, while illustrated and discussed as specific types of computing devices, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to perform the functionality (e.g., data generation functionality, data transmission functionality, etc.) of the computing devices discussed below.

The chassis 302 may also house a storage system (not illustrated, but which may include the storage 108 discussed above with reference to FIG. 1) that is coupled to the processing system and that is configured to store any of the information utilized by the processing system. The chassis 302 may also house a communication system that is coupled to the processing system and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system may include a port 304 (which may be either (or both) of the ports 200a and 202a discussed above with reference to FIG. 2) that is included on the chassis 302, and a hybrid electrical/optical data/power connector 306 that is accessible via the port 304.

With reference to FIG. 3B, the hybrid electrical/optical data/power connector 306 is illustrated in more detail, and includes a plurality of alignment members 306a that are configured to align a hybrid electrical/optical data/power connector on a hybrid electrical/optical data/power cable provided according to the teachings of the present disclosure with the hybrid electrical/optical data/power connector 306. The hybrid electrical/optical data/power connector 306 also includes a hybrid electrical/optical data/power transmission wire connector element 308, and a hybrid electrical/optical data/power transmission wire connector element 310. In the illustrated embodiment, the hybrid electrical/optical data/power transmission wire connector element 308 includes an insulating element 308a, a power transmission element 308b, an insulating element 308c, and an optical signal transmission element 308d. Similarly, the hybrid electrical/optical data/power transmission wire connector element 310 includes an insulating element 310a, a power transmission element 310b, an insulating element 310c, and an optical signal transmission element 310d.

In the examples below, the power transmission elements 308b and 310b may include a copper material and/or any other materials that one of skill in the art in possession of the present disclosure would recognize as capable of transmitting power as discussed below, and the optical signal transmission elements 308b and 310b may include a fiber optical material and/or any other materials that one of skill in the art in possession of the present disclosure would recognize as capable of transmitting optical signals as discussed below. Furthermore, the insulating elements 308a, 308c, 310a, and 310c may be provided by any material that one of skill in the art in possession of the present disclosure would recognize as being capable of separating the power transmission elements 308b and 310b and their corresponding optical signal transmission elements 308b and 310b in the hybrid electrical/optical data/power transmission wire connector elements 308 and 310.

Returning back to FIG. 3A, each of the power transmission elements 308b and 310b on the hybrid electrical/optical data/power connector 306 may be coupled via a power coupling to a power subsystem (and/or other components) in the computing device 300, and FIG. 3A illustrates a power coupling 311 coupled to the power transmission element 308b. Similarly, each of the optical signal transmission elements 308b and 310b on the hybrid electrical/optical data/power connector 306 may be coupled via an optical signal coupling to a Serializer/Deserializer (SERDES) subsystem 312 in the computing device 300 that is further coupled via an electrical signal coupling to other components (e.g., a processing system) in the computing device 300, and FIG. 3A illustrates an optical signal coupling 314a coupling the optical signal transmission element 308b to the SERDES subsystem 312, along with an electrical signal coupling 314b that may extend between the SERDES subsystem 312 and other components (e.g., a processing system) in the computing device 300. As will be appreciated by one of skill in the art in possession of the present disclosure, the SERDES subsystem 312 may be configured to convert between electrical signals and optical signals, and may include or be coupled to a laser subsystem (not illustrated) that is configured to emit a laser to transmit the optical data signals provided by the SERDES subsystem 312 via the optical signal transmission element 308b. However, while a specific computing device is illustrated, one of skill in the art in possession of the present disclosure will appreciate that the computing device 300 illustrated in FIGS. 3A and 3B is only used in some embodiments of the present disclosure, and may include other components and/or configurations to provide the functionality discussed below while remaining within the scope of the present disclosure as well.

Figure 4:
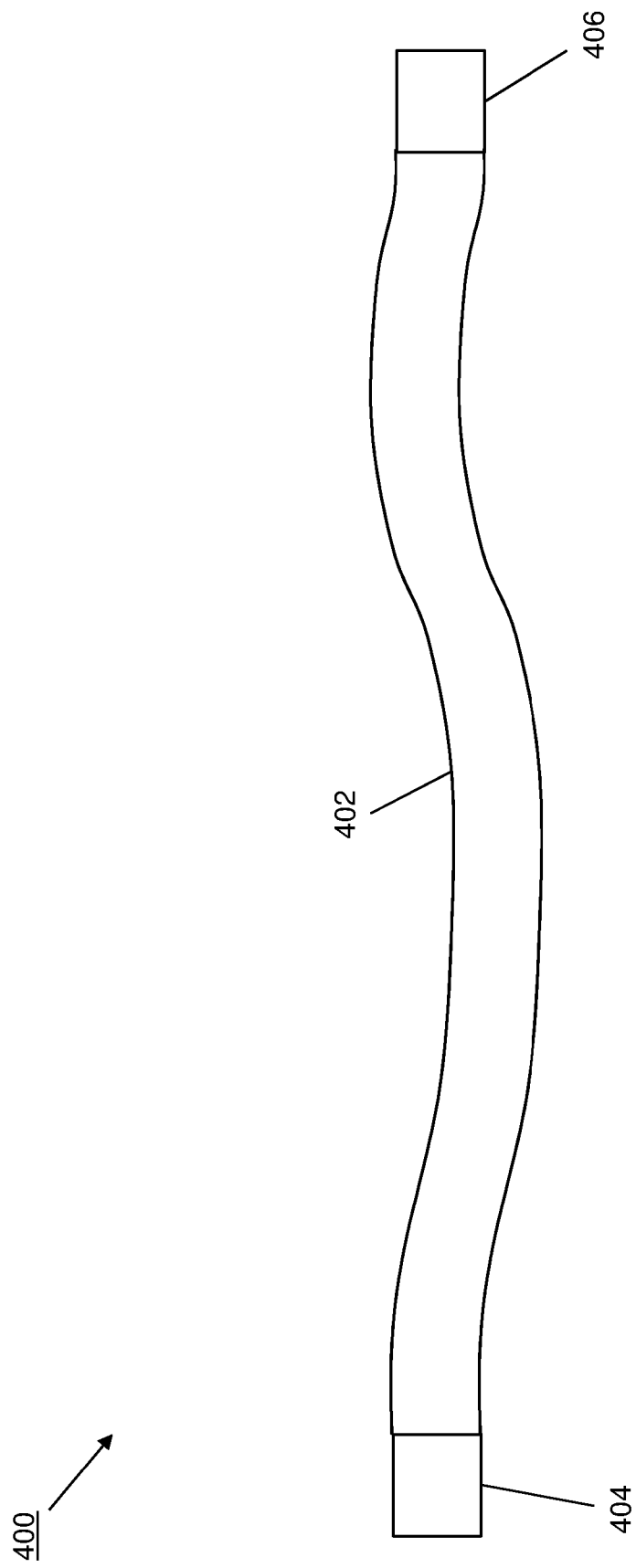
FIG. 4 is a schematic view illustrating an embodiment of a hybrid electrical/optical data/power cable that may be provided as part of the hybrid electrical/optical data/power cabling system of the present disclosure.

Referring now to FIG. 4, a hybrid electrical/optical data/power cable 400 provided according to the teachings of the present disclosure is illustrated. In the illustrated embodiment, the hybrid electrical/optical data/power cable 400 includes an elongated base 402 having a cable connector 404 located on a first end of the elongated base 402, and a cable connector 406 located on a second end of the elongated base 402. As will be appreciated by one of skill in the art in possession of the present disclosure, the base 402 may be provided in a variety of lengths, from relatively short lengths of approximately 1 foot long, up to relatively long lengths that are limited by the power transmission capabilities of the power transmission elements in the hybrid electrical/optical data/power cable 400 (e.g., approximately 100 meters in length for conventional gauge copper-based power transmission wires.)

Figure 5A:
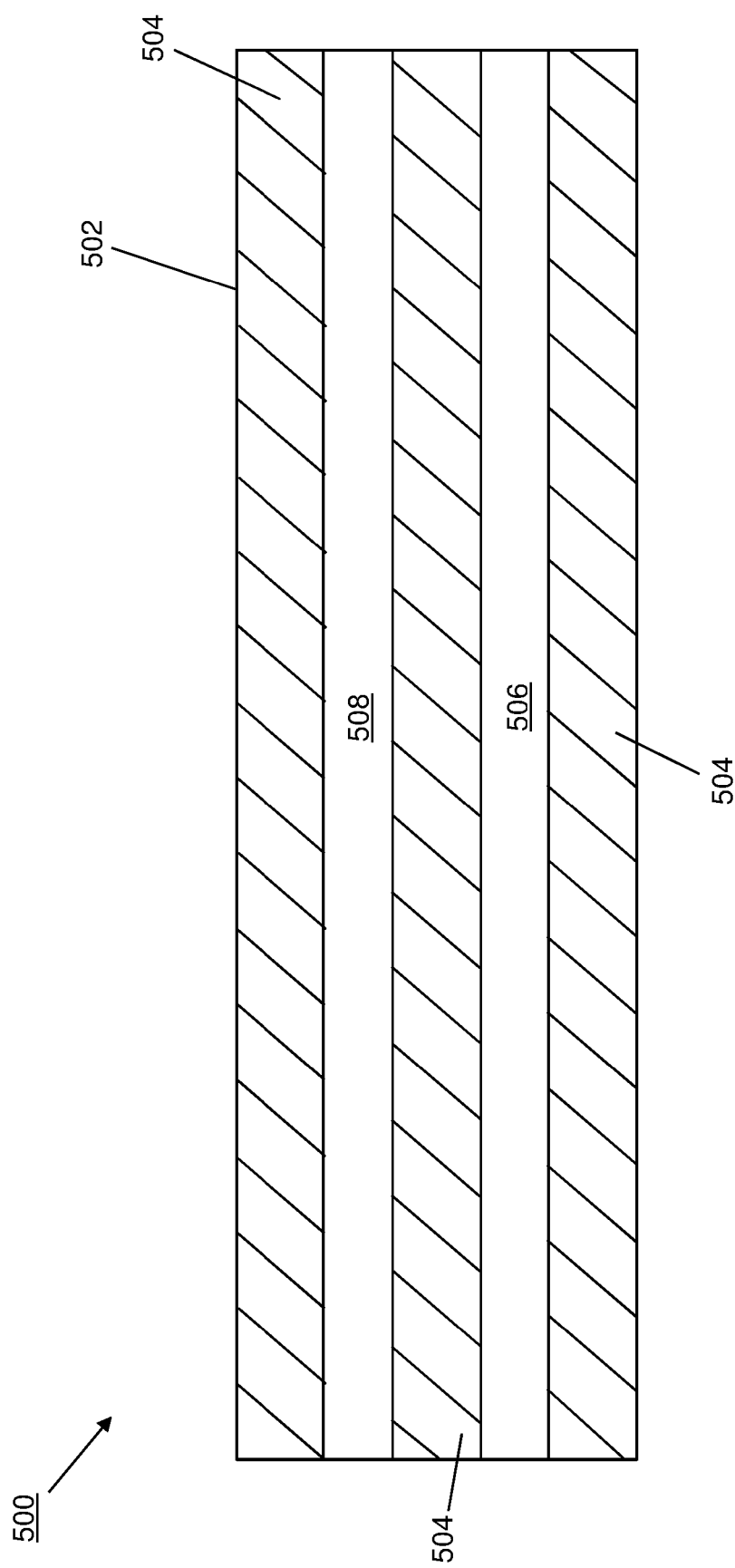
FIG. 5A is a top cross-sectional view illustrating an embodiment of the hybrid electrical/optical data/power cable of FIG. 4.
Figure 5B:
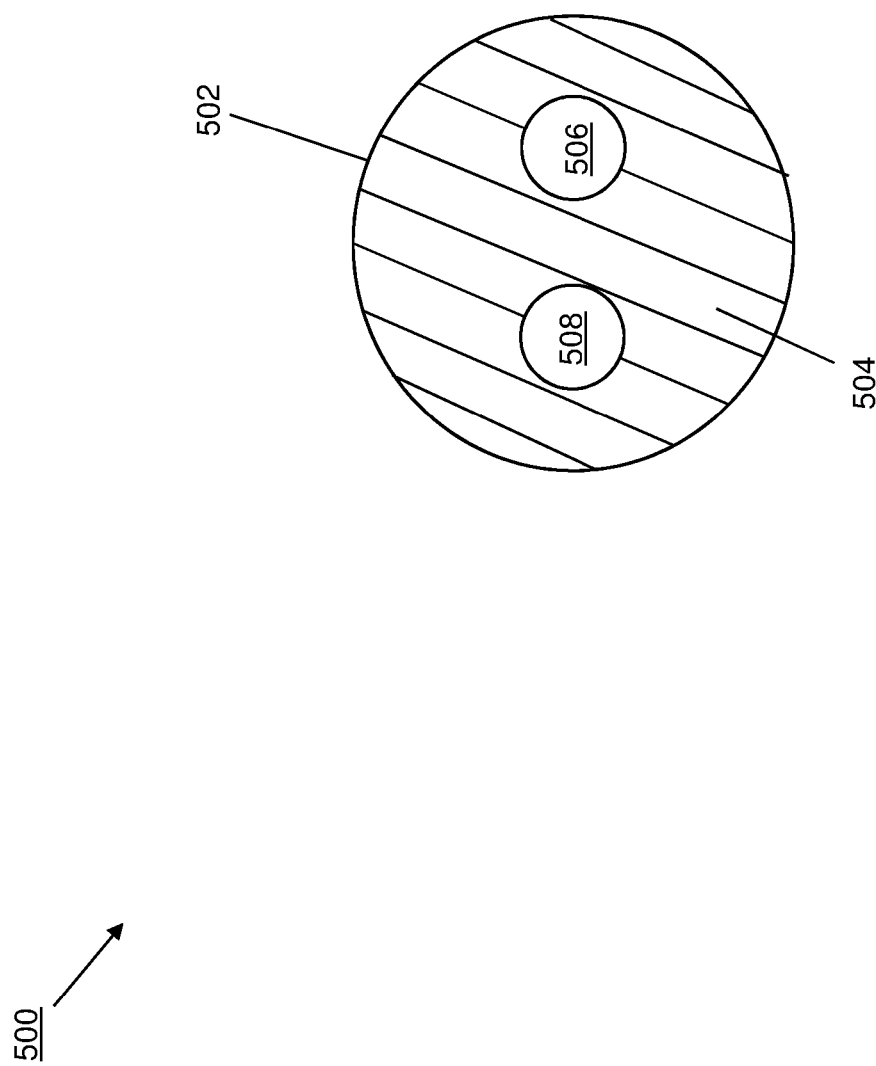
FIG. 5B is a front cross-sectional view illustrating an embodiment of the hybrid electrical/optical data/power cable of FIG. 4.

Referring now to FIGS. 5A and 5B, a hybrid electrical/optical data/power cable 500 is illustrated that may provide an embodiment of the hybrid electrical/optical data/power cable 400 discussed above with reference to FIG. 4, and that may be utilized outdoors and/or in other "rugged" environments, and one of skill in the art in possession of the present disclosure will appreciate that the hybrid electrical/optical data/power cable 500 illustrated in FIGS. 5A and 5B provides cross-sections of an embodiment of the hybrid electrical/optical data/power cable 400 illustrated in FIG. 4. In the illustrated embodiment, the hybrid electrical/optical data/power cable 500 includes a base 502 that may be the base 402 discussed above with reference to FIG. 4. In the illustrated embodiment, the base 502 includes a jacket material 504 that may be provided by a rubber materials, plastic materials, vinyl materials and/or other materials suited for outdoor, weather-proof, and/or otherwise "rugged" environments. As such, one of skill in the art in possession of the present disclosure will appreciate that the jacket material 504 may be provided by a variety of protective cabling material known in the art. In the illustrated embodiment, a hybrid electrical/optical data/power transmission wire 506 provided according to the teachings of the present disclosure is located within the jacket material 504 on the base 502, and a hybrid electrical/optical data/power transmission wire 508 provided according to the teachings of the present disclosure is located within the jacket material 504 on the base 502 in a spaced apart orientation from the hybrid electrical/optical data/power transmission wire 506.

Figure 6A:
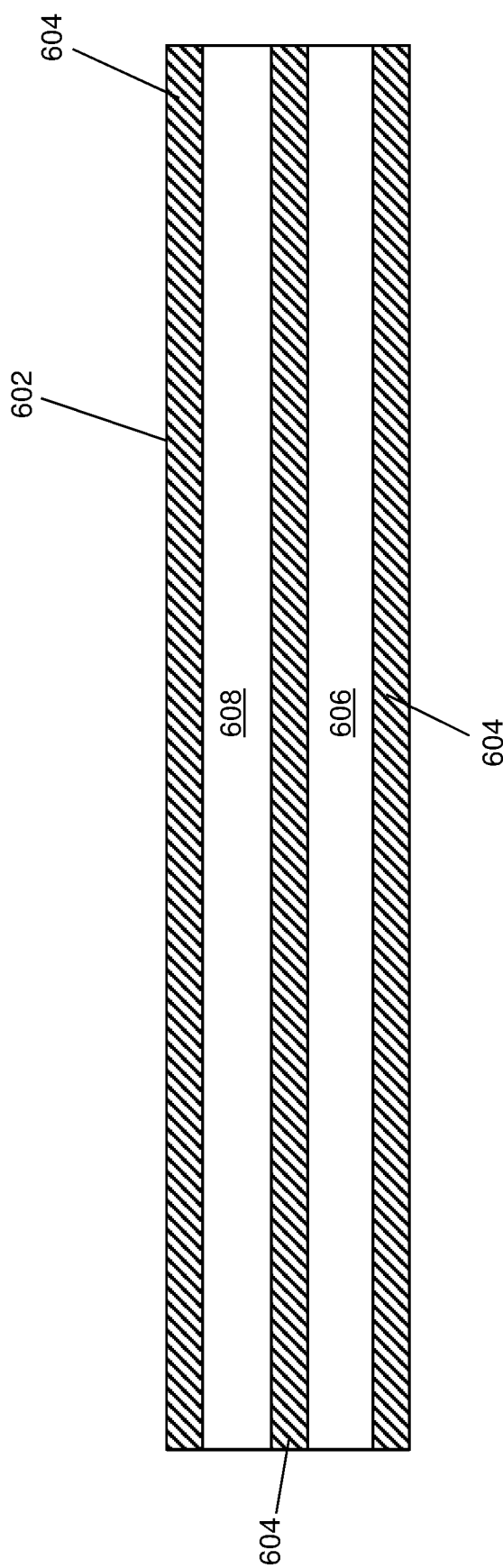
FIG. 6A is a top cross-sectional view illustrating an embodiment of the hybrid electrical/optical data/power cable of FIG. 4.
Figure 6B:
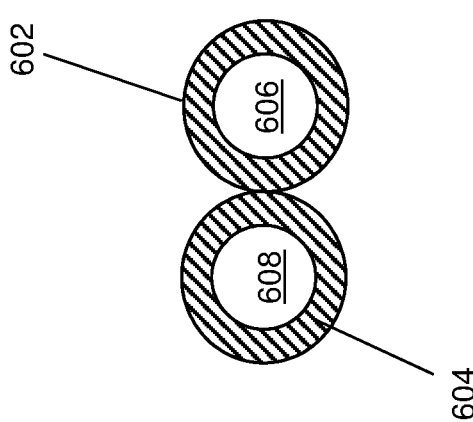
FIG. 6B is a front cross-sectional view illustrating an embodiment of the hybrid electrical/optical data/power cable of FIG. 4.

Referring now to FIGS. 6A and 6B, a hybrid electrical/optical data/power cable 600 is illustrated that may provide an embodiment of the hybrid electrical/optical data/power cable 400 discussed above with reference to FIG. 4, and that may be utilized indoors and/or in other "protected" environments, and one of skill in the art in possession of the present disclosure will appreciate that the hybrid electrical/optical data/power cable 600 illustrated in FIGS. 6A and 6B provides cross-sections of an embodiment of the hybrid electrical/optical data/power cable 400 illustrated in FIG. 4. In the illustrated embodiment, the hybrid electrical/optical data/power cable 600 includes a base 602 that may be the base 402 discussed above with reference to FIG. 4. In the illustrated embodiment, the base 602 includes a jacket material 604 that may be provided by a rubber materials, plastic materials, vinyl materials and/or other materials suited for indoor and/or relatively "protected" environments, and thus may be thinner and/or less durable than the materials used for the jacket material 504 in the hybrid electrical/optical data/power cable 500 discussed above with reference to FIGS. 5A and 5B. As such, one of skill in the art in possession of the present disclosure will appreciate that the jacket material 604 may be provided by a variety of protective cabling material known in the art. In the illustrated embodiment, a hybrid electrical/optical data/power transmission wire 606 provided according to the teachings of the present disclosure is located within the jacket material 604 on the base 602, and a hybrid electrical/optical data/power transmission wire 608 provided according to the teachings of the present disclosure is located within the jacket material 604 on the base 602 in a spaced apart orientation from the hybrid electrical/optical data/power transmission wire 606.

Figure 7A:
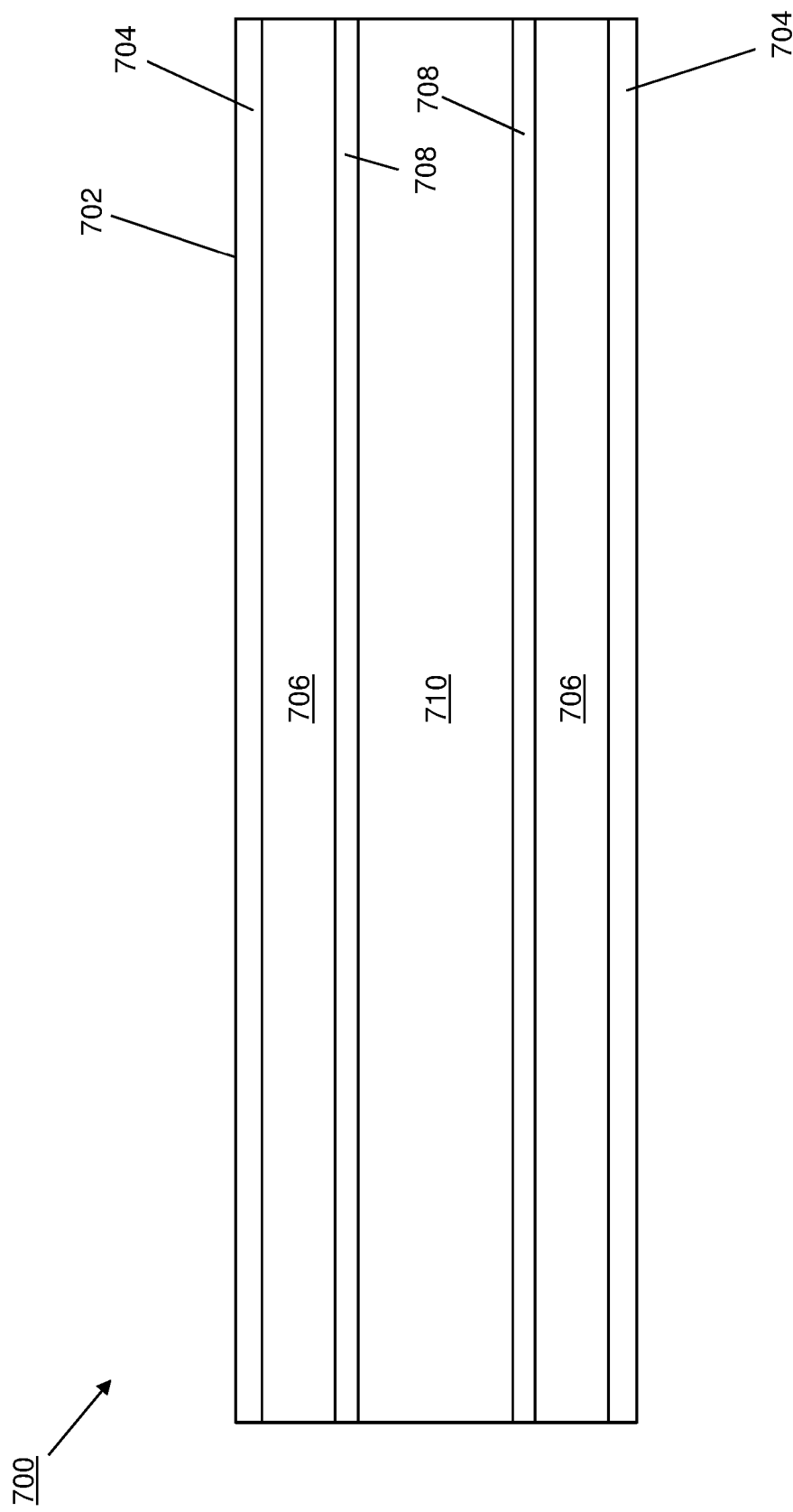
FIG. 7A is a top cross-sectional view illustrating an embodiment of a hybrid electrical/optical data/power wire that may be provided in the hybrid electrical/optical data/power cable of FIG. 4.

Referring now to FIGS. 7A and 7B, a hybrid electrical/optical data/power wire 700 is illustrated that may provide an embodiment of any or all of the hybrid electrical/optical data/power transmission wires 506/606 and the hybrid electrical/optical data/power transmission wires 508/608 discussed above with reference to FIGS. 5A, 5B, 6A, and 6B, and one of skill in the art in possession of the present disclosure will appreciate that the hybrid electrical/optical data/power wire 700 illustrated in FIGS. 7A and 7B provides cross-sections of an embodiment of the hybrid electrical/optical data/power transmission wires 506/606 and/or the hybrid electrical/optical data/power transmission wires 508/608 illustrated in FIGS. 5A, 5B, 6A, and 6B. In the illustrated embodiment, the hybrid electrical/optical data/power wire 700 includes a base 702. In the illustrated embodiment, the base 702 includes an insulating layer 704 that may be provided by a cladding material and/or other cable insulating materials that would be apparent to one of skill in the art in possession of the present disclosure.

The base 702 also includes a power transmission layer 706 that engages the insulating layer 704 and that may be provided by a copper material (e.g., a copper tube or copper "sheath" in the illustrated embodiment), and/or other power transmission materials that would be apparent to one of skill in the art in possession of the present disclosure. The base 702 also includes an insulating layer 708 that engages the power transmission layer 706 and that may be provided by a cladding material and/or other cable layer insulating materials that would be apparent to one of skill in the art in possession of the present disclosure. The base 702 also includes an optical signal transmission layer 710 that engages the insulating layer 708 and that may be provided by a fiber optic material (e.g., a fiber optical wire in the illustrated embodiment), and/or other optical signal transmission materials that would be apparent to one of skill in the art in possession of the present disclosure. However, while a specific example has been illustrated and described one of skill in the art in possession of the present disclosure will appreciate that other components for transmitting power and optical signals may be utilized in the hybrid electrical/optical data/power wire 700 while remaining within the scope of the present disclosure as well.

Figure 8:
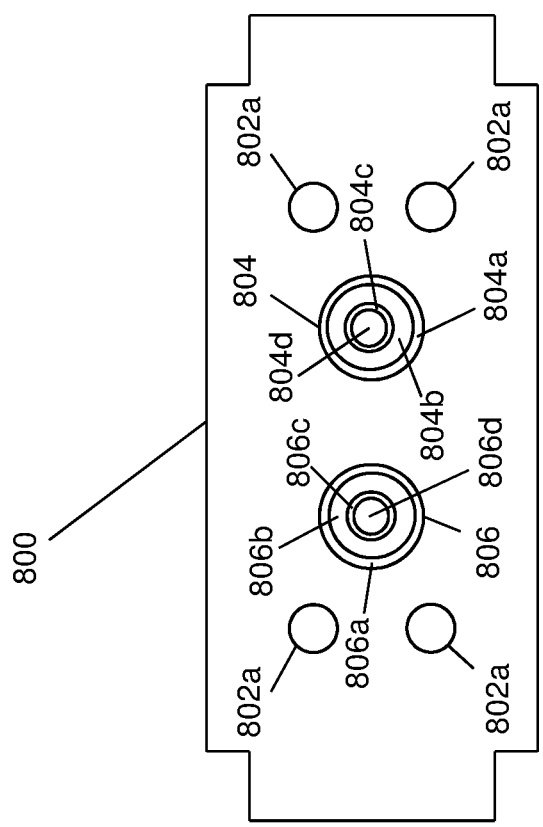
FIG. 8 is a schematic view illustrating an embodiment of a hybrid electrical/optical data/power cable connector that may be provided on the hybrid electrical/optical data/power cable of FIG. 4.

With reference to FIG. 8, a hybrid electrical/optical data/power connector 800 is illustrated that provides an embodiment of either (or both) of the cable connectors 404 and 406 on the hybrid electrical/optical data/power cable 400 discussed above with reference to FIG. 4. In the illustrated embodiment, the hybrid electrical/optical data/power connector 800 includes a plurality of alignment members 802a that are configured to align the hybrid electrical/optical data/power connector 800 with a hybrid electrical/optical data/power connector on a computing device provided according to the teachings of the present disclosure, or a hybrid electrical/optical data/power connector on a hybrid electrical/optical data/power transceiver device provided according to the teachings of the present disclosure. The hybrid electrical/optical data/power connector 800 also includes a hybrid electrical/optical data/power transmission wire connector element 804, and a hybrid electrical/optical data/power transmission wire connector element 806. In the illustrated embodiment, the hybrid electrical/optical data/power transmission wire connector element 804 includes an insulating element 804a, a power transmission element 804b, an insulating element 804c, and an optical signal transmission element 804d. Similarly, the hybrid electrical/optical data/power transmission wire connector element 806 includes an insulating element 806a, a power transmission element 806b, an insulating element 806c, and an optical signal transmission element 806d. In the examples below, the power transmission elements 804b and 806b may include a copper material and/or any other materials that one of skill in the art in possession of the present disclosure would recognize as capable of transmitting power as discussed below, and the optical signal transmission elements 804b and 806b may include a fiber optical material and/or any other materials that one of skill in the art in possession of the present disclosure would recognize as capable of transmitting optical signals as discussed below Referring now to FIG. 9, a hybrid electrical/optical data/power cable 900 is illustrated that may provide an embodiment of the hybrid electrical/optical data/power cable 400 discussed above with reference to FIG. 4. In the illustrated embodiment, the hybrid electrical/optical data/power cable 900 includes a base 902 that may be the base 402 on the hybrid electrical/optical data/power cable 400 discussed above with reference to FIG. 4, and a cable connector 904 that may be either of the cable connectors 404 or 406 on the hybrid electrical/optical data/power cable 400 discussed above with reference to FIG. 4. In an embodiment, the base 902 may include hybrid electrical/optical data/power transmission wires that are each similar to the hybrid electrical/optical data/power wire 700 discussed above with reference to FIGS. 7A and 7B, and FIG. 9 illustrates one of those hybrid electrical/optical data/power transmission wires 906 having a power transmission layer 906a similar to the power transmission layer 706 discussed above, and an optical signal transmission layer 906b similar to the optical signal transmission layer 710.

Figure 9:
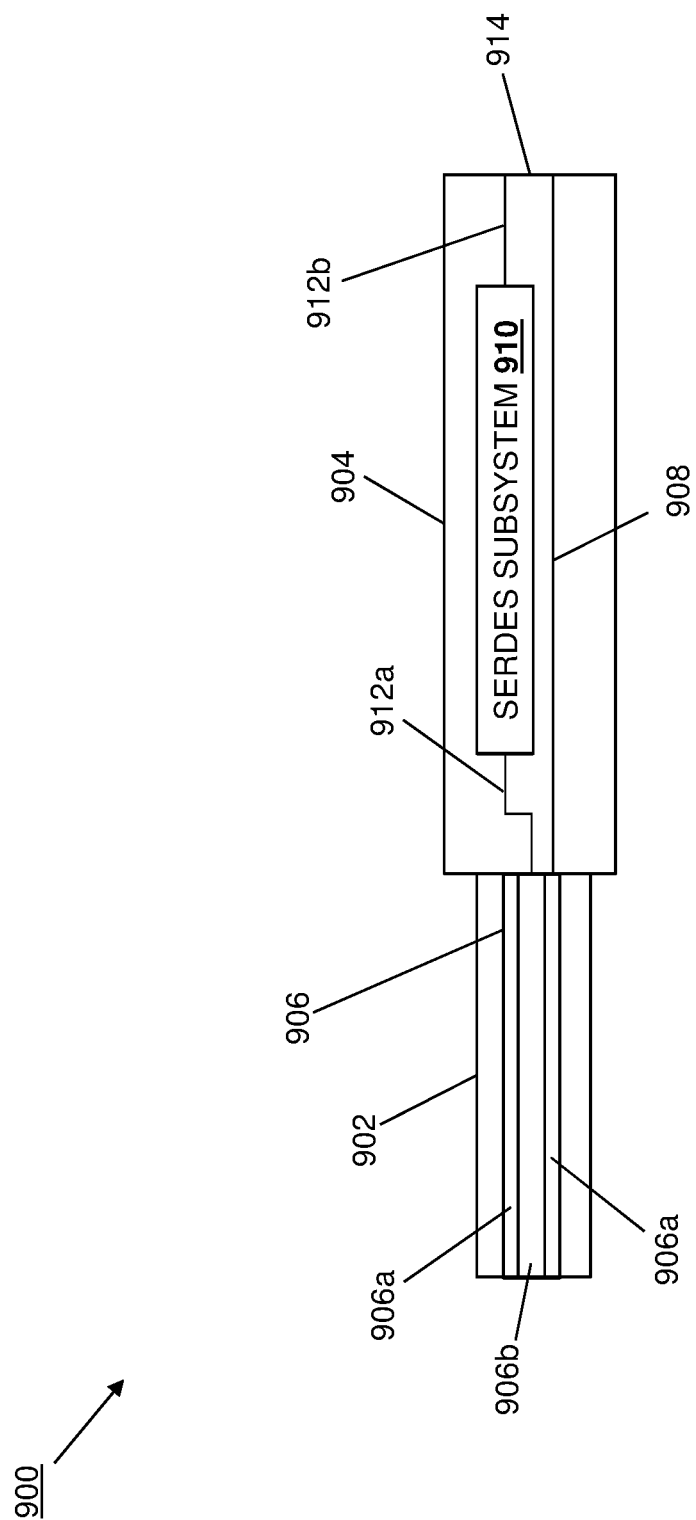
FIG. 9 is a schematic view illustrating an embodiment of the hybrid electrical/optical data/power cable of FIG. 4.

As illustrated in FIG. 9, the power transmission layers in the hybrid electrical/optical data/power transmission wires in the base 902 may be coupled via a power coupling to a connector end 914 of the cable connector 904, and FIG. 9 illustrates a power coupling 908 that connects the power transmission layer 906a to the connector end 914 of the cable connector 904. Similarly, the optical signal transmission layers in the hybrid electrical/optical data/power transmission wires in the base 902 may be coupled via an optical signal coupling to a Serializer/Deserializer (SERDES) subsystem 910 in the cable connector 904 that is further coupled via an electrical signal coupling to the connector end 914 of the cable connector 904, and FIG. 9 illustrates an optical signal coupling 912a coupling the optical signal transmission element 906b to the SERDES subsystem 910, along with an electrical signal coupling 912b that extends between the SERDES subsystem 910 the connector end 914 of the cable connector 904.

In an embodiment, the connector end 914 of the cable connector 904 may include a card connector edge connector similar to those found on Quad Small Form-factor Pluggable (QSFP) transceiver devices, and/or any other connector end that one of skill in the art in possession of the present disclosure will recognize as capable of transmitting optical data signals and power in the manner described below. As will be appreciated by one of skill in the art in possession of the present disclosure, the SERDES subsystem 910 may be configured to convert between electrical signals and optical signals, and may include or be coupled to a laser subsystem (not illustrated) that is configured to emit a laser to transmit the optical signals provided by the SERDES subsystem 910 via the optical signal transmission element 906b. While the electrical/optical data signal conversion components (e.g., the SERDES subsystem 910, the unillustrated laser subsystem, etc.) are illustrated and/or described as being located in the cable connector 904, one of skill in the art in possession of the present disclosure will appreciate that some or all of those components may be located in the base 902 while remaining within the scope of the present disclosure as well. However, while a specific hybrid electrical/optical data/power cable 900 is illustrated, one of skill in the art in possession of the present disclosure will appreciate that the hybrid electrical/optical data/power cable 900 illustrated in FIG. 9 is only used in some embodiments of the present disclosure, and may include other components and/or configurations to provide the functionality discussed below while remaining within the scope of the present disclosure as well.

Figure 10A:
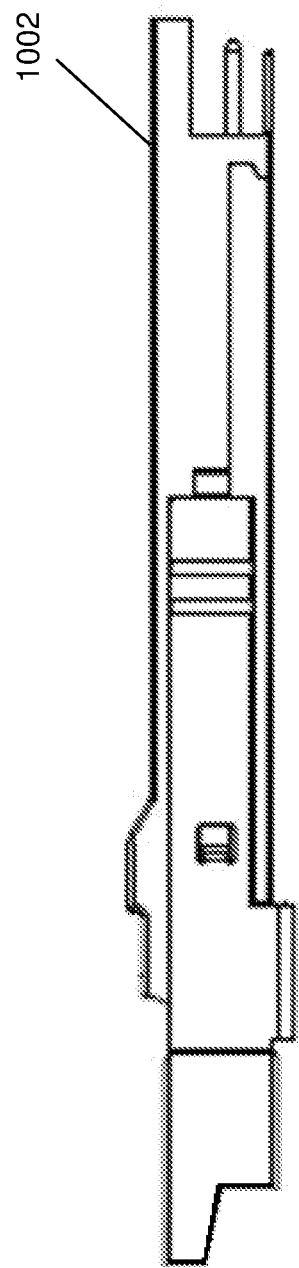
FIG. 10A is a side view illustrating an embodiment of a hybrid electrical/optical data/power transceiver device that may be provided as part of the hybrid electrical/optical data/power cabling system of the present disclosure.
Figure 10B:
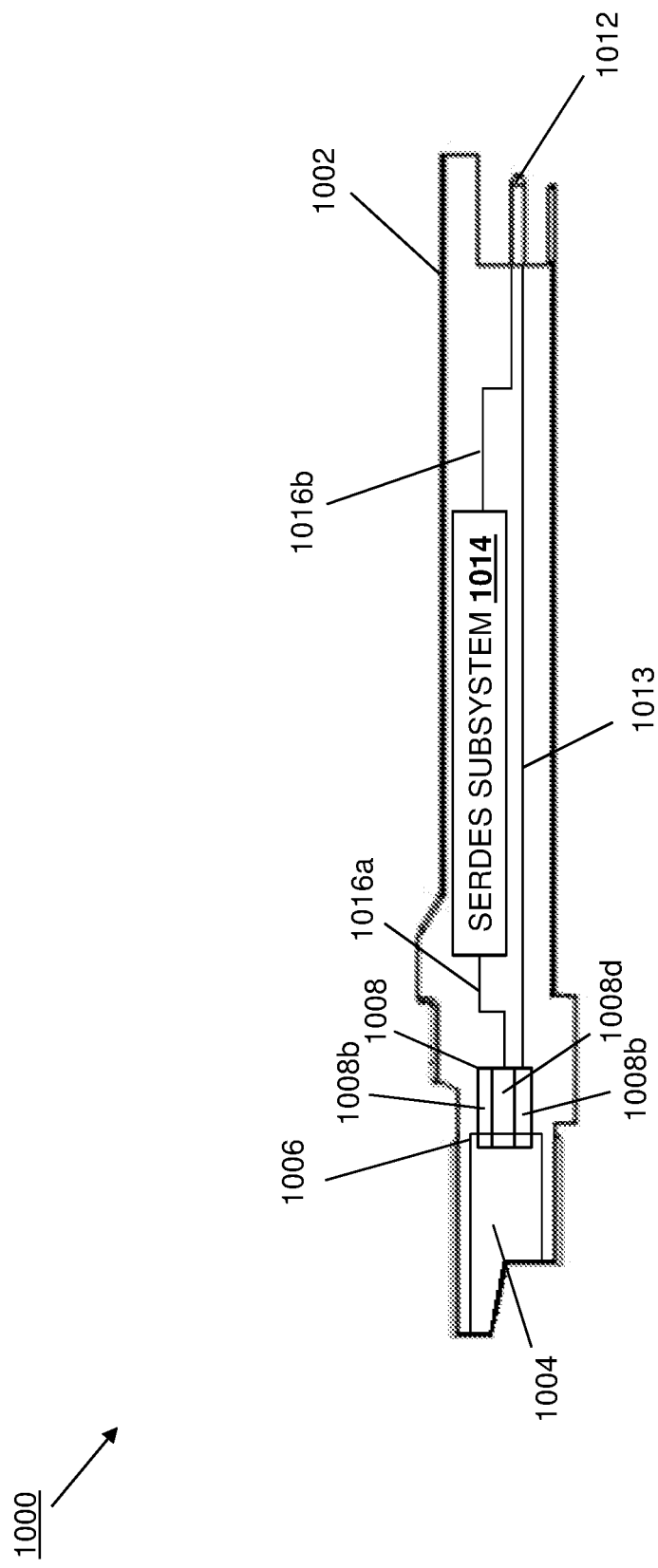
FIG. 10B is a schematic view illustrating an embodiment of the hybrid electrical/optical data/power transceiver device of FIG. 10A.

Referring now to FIGS. 10A, 10B, and 100, an embodiment of a hybrid electrical/optical data/power transceiver device 1000 is illustrated. The hybrid electrical/optical data/power transceiver device 1000 includes a chassis 1002 that houses the components of the hybrid electrical/optical data/power transceiver device 1000, only some of which are illustrated in FIG. 10B. For example, the chassis 1002 includes a port 1004, and a hybrid electrical/optical data/power connector 1006 may be accessible via the port 1004. In an embodiment, the hybrid electrical/optical data/power connector 1006 includes a plurality of alignment members 1006a that are configured to align a hybrid electrical/optical data/power connector on a hybrid electrical/optical data/power cable provided according to the teachings of the present disclosure with the hybrid electrical/optical data/power connector 1006. The hybrid electrical/optical data/power connector 1006 also includes a hybrid electrical/optical data/power transmission wire connector element 1008, and a hybrid electrical/optical data/power transmission wire connector element 1010. In the illustrated embodiment, the hybrid electrical/optical data/power transmission wire connector element 1008 includes an insulating element 1008a, a power transmission element 1008b, an insulating element 1008c, and an optical signal transmission element 1008d. Similarly, the hybrid electrical/optical data/power transmission wire connector element 1010 includes an insulating element 1010a, a power transmission element 1010b, an insulating element 1010c, and an optical signal transmission element 1010d.

In the examples below, the power transmission elements 1008b and 1010b may include a copper material and/or any other materials that one of skill in the art in possession of the present disclosure would recognize as capable of transmitting power as discussed below, and the optical signal transmission elements 1008b and 1010b may include a fiber optical material and/or any other materials that one of skill in the art in possession of the present disclosure would recognize as capable of transmitting optical signals as discussed below. Furthermore, the insulating elements 1008a, 1008c, 1010a, and 1010c may be provided by any material that one of skill in the art in possession of the present disclosure would recognize as being capable of separating the power transmission elements 108b and 1010b and their corresponding optical signal transmission elements 1008b and 1010*b* in the hybrid electrical/optical data/power transmission wire connector elements 1008 and 1010.

Each of the power transmission elements 1008*b* and 1010*b* on the hybrid electrical/optical data/power connector 1006 may be coupled via a power coupling to a connector 1012 on the hybrid electrical/optical data/power transceiver device 1000, and FIG. 10B illustrates a power coupling 1013 coupled to the power transmission element 1008*b* and the connector 1012. Similarly, each of the optical signal transmission elements 1008*b* and 1010*b* on the hybrid electrical/optical data/power connector 1006 may be coupled via an optical signal coupling to a Serializer/Deserializer (SERDES) subsystem 1014 in the hybrid electrical/optical data/power transceiver device 1000 that is further coupled via an electrical signal coupling to the connector 1012 on the hybrid electrical/optical data/power transceiver device 1000, and FIG. 10B illustrates an optical signal coupling 1016*a* coupling the optical signal transmission element 1008*d* to the SERDES subsystem 1014, along with an electrical signal coupling 1016*b* that may extend between the SERDES subsystem 1014 and the connector 1012 on the hybrid electrical/optical data/power transceiver device 1000.

Figure 10C:
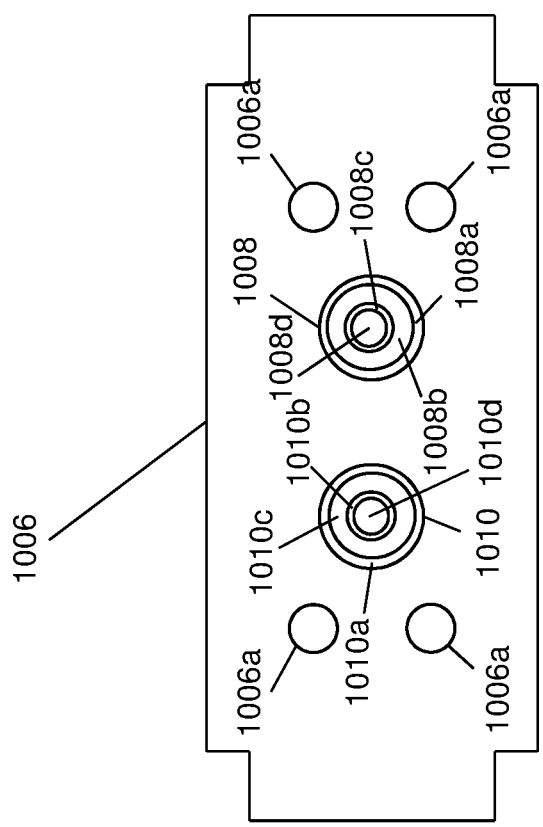
FIG. 10O is a schematic view illustrating an embodiment of a hybrid electrical/optical data/power cable connector that may be provided on the hybrid electrical/optical data/power transceiver device of FIGS. 10A and 10B.

As will be appreciated by one of skill in the art in possession of the present disclosure, the SERDES subsystem 1014 may be configured to convert between electrical signals and optical signals, and may include or be coupled to a laser subsystem (not illustrated) that is configured to emit a laser to transmit the optical signals provided by the SERDES subsystem 1014 via the optical signal transmission element 1008*d*. However, while a specific hybrid electrical/optical data/power transceiver device is illustrated, one of skill in the art in possession of the present disclosure will appreciate that the hybrid electrical/optical data/power transceiver device 1000 illustrated in FIGS. 10A-10C is only used in some embodiments of the present disclosure, and may include other components and/or configurations to provide the functionality discussed below while remaining within the scope of the present disclosure as well.

Figure 11:
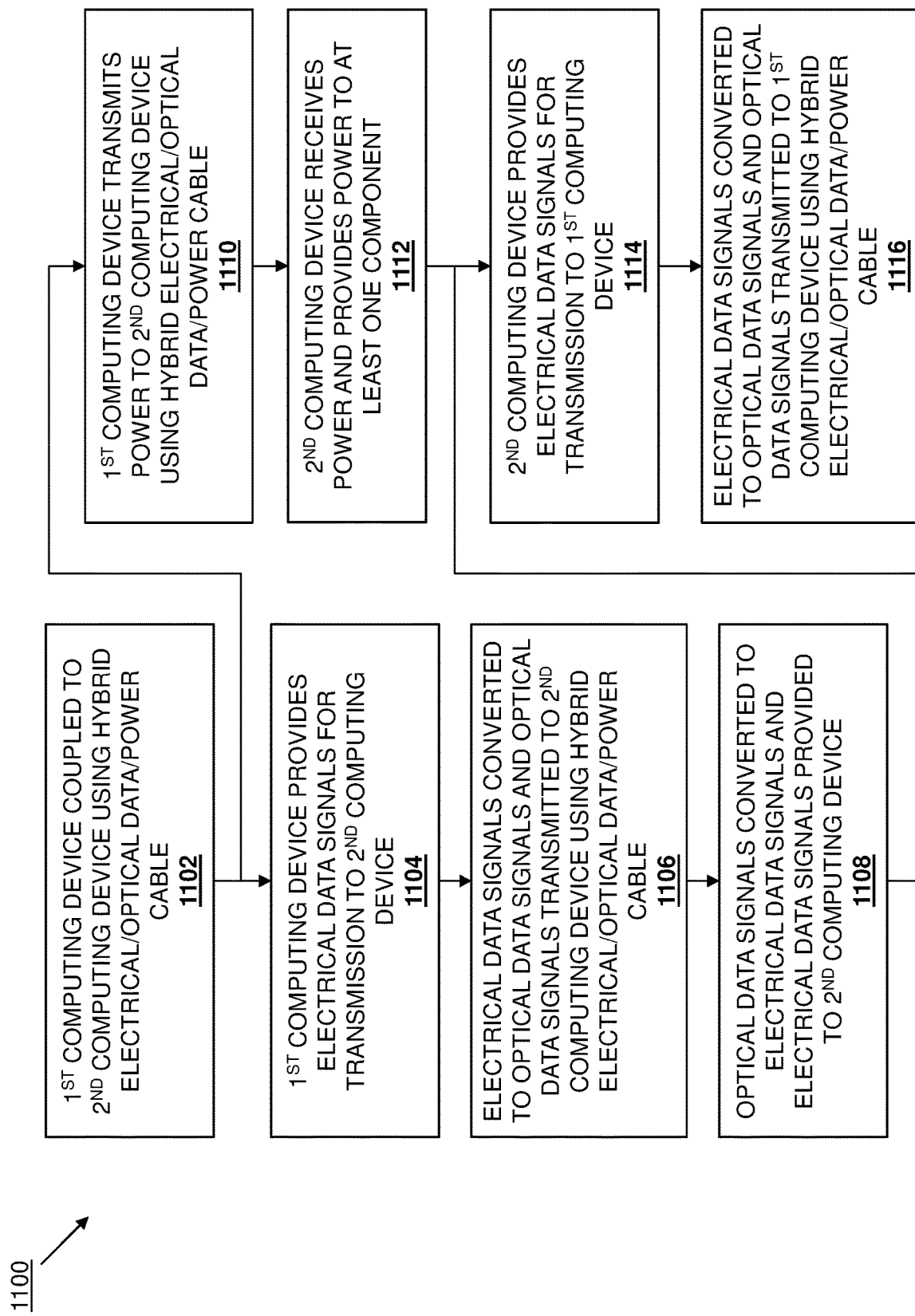
FIG. 11 is a flow chart illustrating an embodiment of a method for transmitting data and power.

Referring now to FIG. 11, an embodiment of a method 1100 for transmitting data and power is illustrated. As discussed below, the systems and methods of the present disclosure provide for the transmission of power and optical data between computing devices via a single, hybrid electrical/optical data/power cable. For example, the hybrid electrical/optical data/power cable may include one or more hybrid electrical/optical data/power wires that each have a power transmission element that is configured to transmit power, and an optical signal transmission element that is configured to transmit optical data signals. As such, a PSE computing device may provide electrical data signals and power for transmission to a PD computing device, the electrical data signals may be converted to optical data signals, the optical data signals may be transmitted along with the power via the hybrid electrical/optical data/power cable to the PD computing device (e.g., with the power transmitted via the power transmission element(s) in the hybrid electrical/optical data/power wire(s) and the optical data signals transmitted via the optical signal transmission element(s) in the hybrid electrical/optical data/power wires.) Following their transmission via the hybrid electrical/optical data/power cable, the optical data signals may be converted to electrical data signals, and the electrical data signals may be provided along with the power to the PD computing device. The PD computing device may then utilize the electrical data signals, and provide the power to at least one component. As will be appreciated by one of skill in the art in possession of the present disclosure, the PD computing device may also provide electrical data signals for transmission to the PSE computing device, those electrical data signals may be converted to optical data signals, and those the optical data signals may be transmitted via the hybrid electrical/optical data/power cable to the PSE computing device (e.g., with the optical data signals transmitted via the optical signal transmission element(s) in the hybrid electrical/optical data/power wires). As such, a data/power transmission cable is provided that has increased data transmission bandwidth relative to conventional data/power transmission cables.

The method 1100 begins at block 1102 where a first computing device is coupled to a second computing device using a hybrid electrical/optical data/power cable. In different embodiments, at block 1102, the hybrid electrical/optical data/power cable of the present disclosure may be used to couple together a pair of computing devices. For example, with reference to FIG. 12, an embodiment of the hybrid electrical/optical data/power cabling system of the present disclosure is illustrated with the PSE computing device 200 coupled to the PD computing device 202 using the hybrid electrical/optical data/power cable 400, with the cable connector 404 connected to the port 200*a* on the PSE computing device 200, and the cable connector 406 connected to the port 202*a* on the PD computing device 202.

Figure 13:
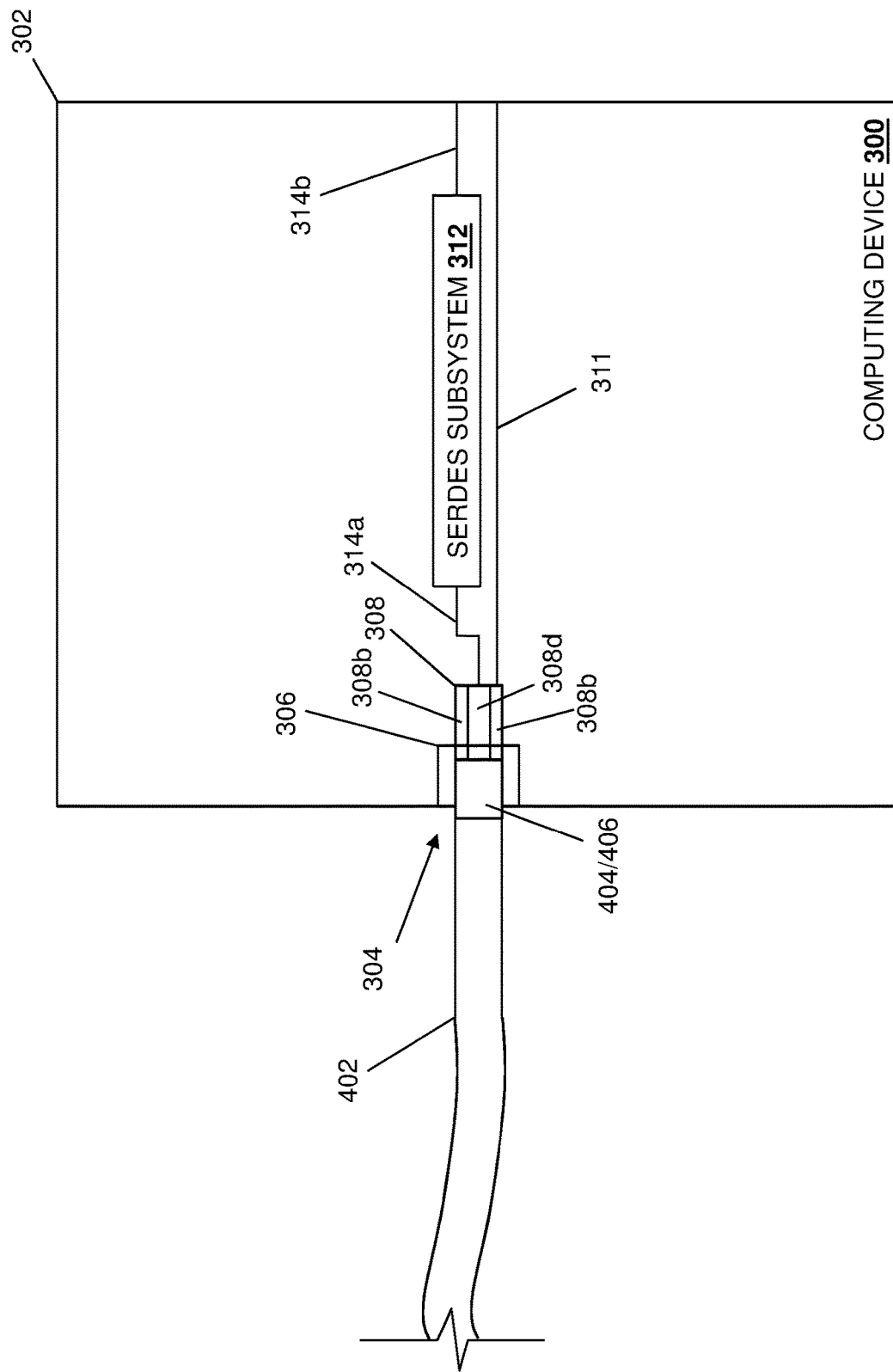
FIG. 13 is a schematic view illustrating an embodiment of the hybrid electrical/optical data/power cable of FIG. 4 connected to the computing device of FIGS. 3A and 3B.

With reference to FIG. 13, an embodiment of the connection of the hybrid electrical/optical data/power cable of the present disclosure to a computing device is illustrated. As illustrated, the cable connector 404 or 406 on the hybrid electrical/optical data/power cable 400 may be connected to the computing device 300 (which may be either of the PSE computing device 200 or the PD computing device 202). For example, the cable connector 404/406/800 may be positioned adjacent the hybrid electrical/optical data/power connector 306 on the computing device 300 such that the hybrid electrical/optical data/power transmission wire connector elements 804 and 806 on the cable connector 404/406/800 face the hybrid electrical/optical data/power transmission wire connector elements 308 and 310, respectively, on the hybrid electrical/optical data/power connector 306. The cable connector 404/406/800 may then be moved towards the hybrid electrical/optical data/power connector 306 such that the alignment elements 802*a* on the cable connector 404/406/800 engage the alignment elements 306*a* on the hybrid electrical/optical data/power connector 306 in order to align the hybrid electrical/optical data/power transmission wire connector elements 804 and 806 on the cable connector 404/406/800 with the hybrid electrical/optical data/power transmission wire connector elements 308 and 310, respectively, on the hybrid electrical/optical data/power connector 306. Continued movement of the cable connector 404/406/800 will secure the cable connector 404/406/800 with the hybrid electrical/optical data/power connector 306 such that the hybrid electrical/optical data/power transmission wire connector elements 804 and 806 on the cable connector 404/406/800 engage the hybrid electrical/optical data/power transmission wire connector elements 308 and 310, respectively, on the hybrid electrical/optical data/power connector 306, as illustrated in FIG. 13.

Figure 14:
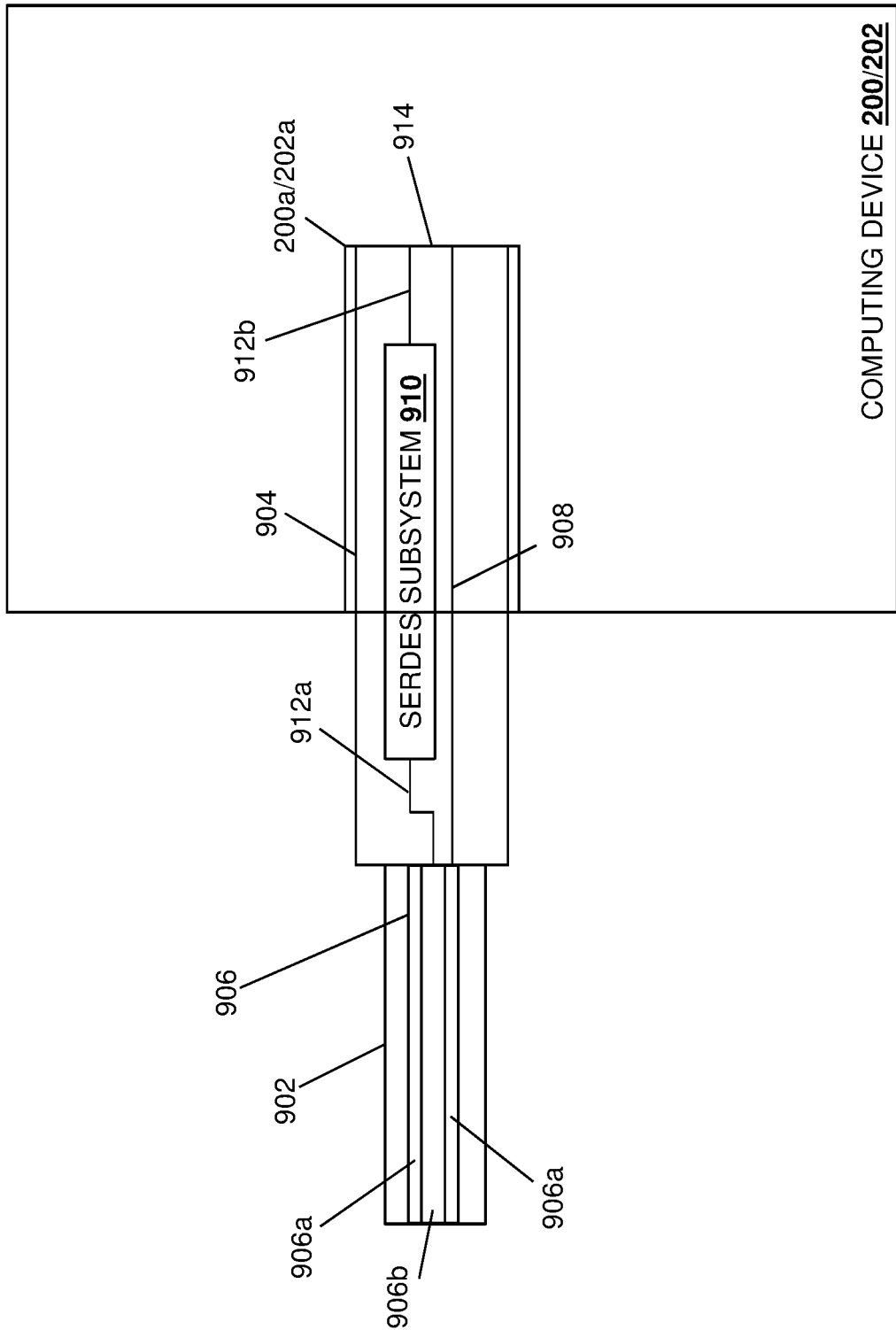
FIG. 14 is a schematic view illustrating an embodiment of the hybrid electrical/optical data/power cable of FIG. 9 connected to one of the computing devices of FIG. 2.

With reference to FIG. 14, another embodiment of the connection of the hybrid electrical/optical data/power cable of the present disclosure to a computing device is illustrated. As illustrated, the cable connector 904 on the hybrid electrical/optical data/power cable 900 may be connected to the PSE computing device 200 or the PD computing device 202. For example, the cable connector 904 may be positioned adjacent the port 200*a*/202*a* on the computing device 200/

202 such that the connector end 914 of the cable connector 904 faces the connector elements included in the port 200a/202a (e.g., QSFP-transceive-like male and female connectors). The cable connector 904 may then be moved towards the port 200a/202a such that the connector end 914 of the cable connector 904 engages on the port 200a/202a, as illustrated in FIG. 14.

Figure 15B:
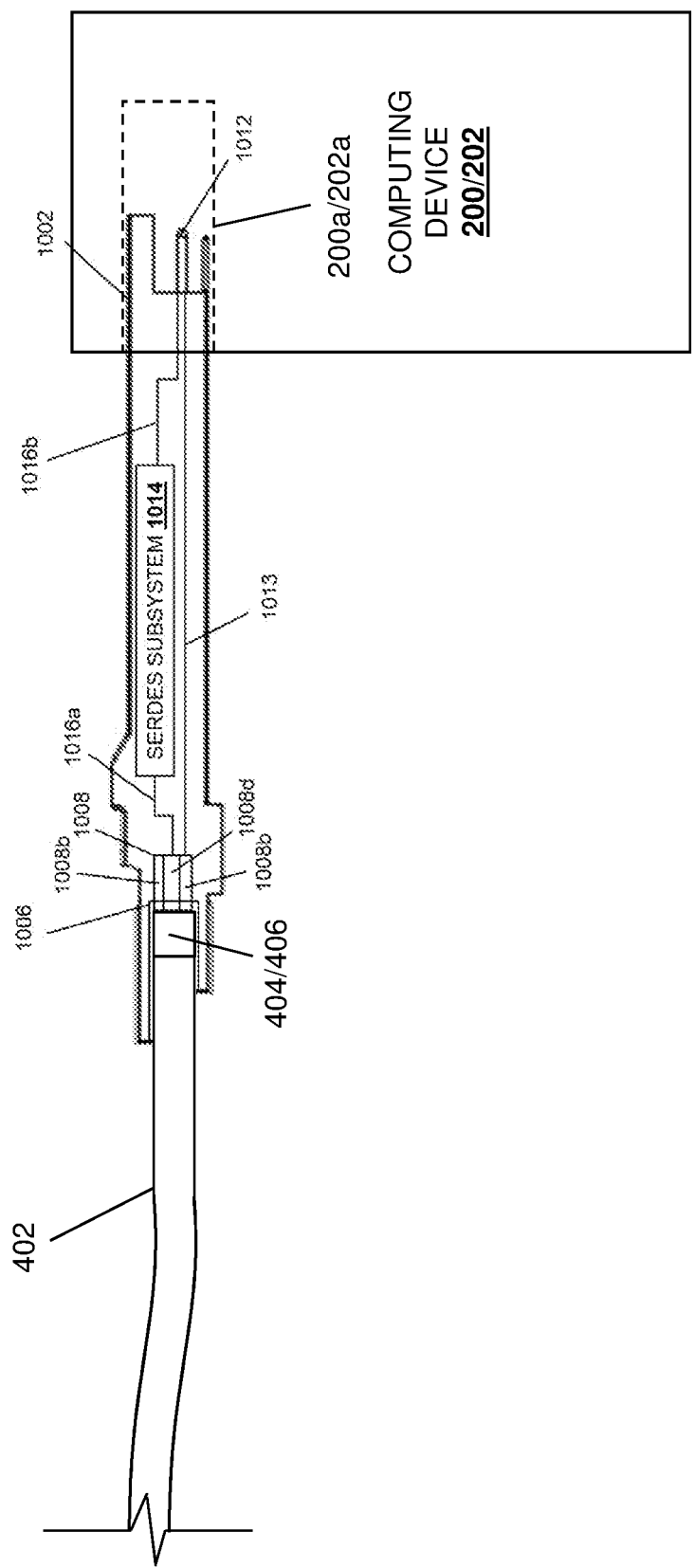
FIG. 15B is a schematic view illustrating an embodiment of the hybrid electrical/optical data/power cable of FIG. 4 connected to the hybrid electrical/optical data/power transceiver device of FIG. 10A-10C that is connected to one of the computing devices of FIG. 2.

With reference to FIGS. 15A and 15B, yet another embodiment of the connection of the hybrid electrical/optical data/power cable of the present disclosure to a computing device is illustrated. As illustrated, the connector 1012 on the hybrid electrical/optical data/power transceiver device 1000 may be connected to the PSE computing device 200 or the PD computing device 202. For example, the connector 1012 may be positioned adjacent the port 200a/202a on the computing device 200/202 such that the connector 1012 on the hybrid electrical/optical data/power transceiver device 1000 faces connector elements on the port 200a/202a. The hybrid electrical/optical data/power transceiver device 1000 may then be moved towards the port 200a/202a such that the connector 1012 on the hybrid electrical/optical data/power transceiver device 1000 engages on the port 200a/202a, as illustrated in FIGS. 15A and 15B.

As illustrated in FIG. 15B, the cable connector 404 or 406 on the hybrid electrical/optical data/power cable 400 may then be connected to the hybrid electrical/optical data/power transceiver device 1000. For example, the cable connector 404/406/800 may be positioned adjacent the port 1004 on the hybrid electrical/optical data/power transceiver device 1000 such that the hybrid electrical/optical data/power transmission wire connector elements 804 and 806 on the cable connector 404/406/800 face the hybrid electrical/optical data/power transmission wire connector elements 1008 and 1010, respectively, on the hybrid electrical/optical data/power connector 1006. The cable connector 404/406/800 may then be moved towards the hybrid electrical/optical data/power connector 1006 such that the alignment elements 802a on the cable connector 404/406/800 engage the alignment elements 1006a on the hybrid electrical/optical data/power connector 1006 in order to align the hybrid electrical/optical data/power transmission wire connector elements 804 and 806 on the cable connector 404/406/800 with the hybrid electrical/optical data/power transmission wire connector elements 1008 and 1010, respectively, on the hybrid electrical/optical data/power connector 1006. Continued movement of the cable connector 404/406/800 will secure the cable connector 404/406/800 with the hybrid electrical/optical data/power connector 1006 such that the hybrid electrical/optical data/power transmission wire connector elements 804 and 806 on the cable connector 404/406/800 engage the hybrid electrical/optical data/power transmission wire connector elements 1008 and 1010, respectively, on the hybrid electrical/optical data/power connector 1006, as illustrated in FIG. 15B.

Figure 15C:
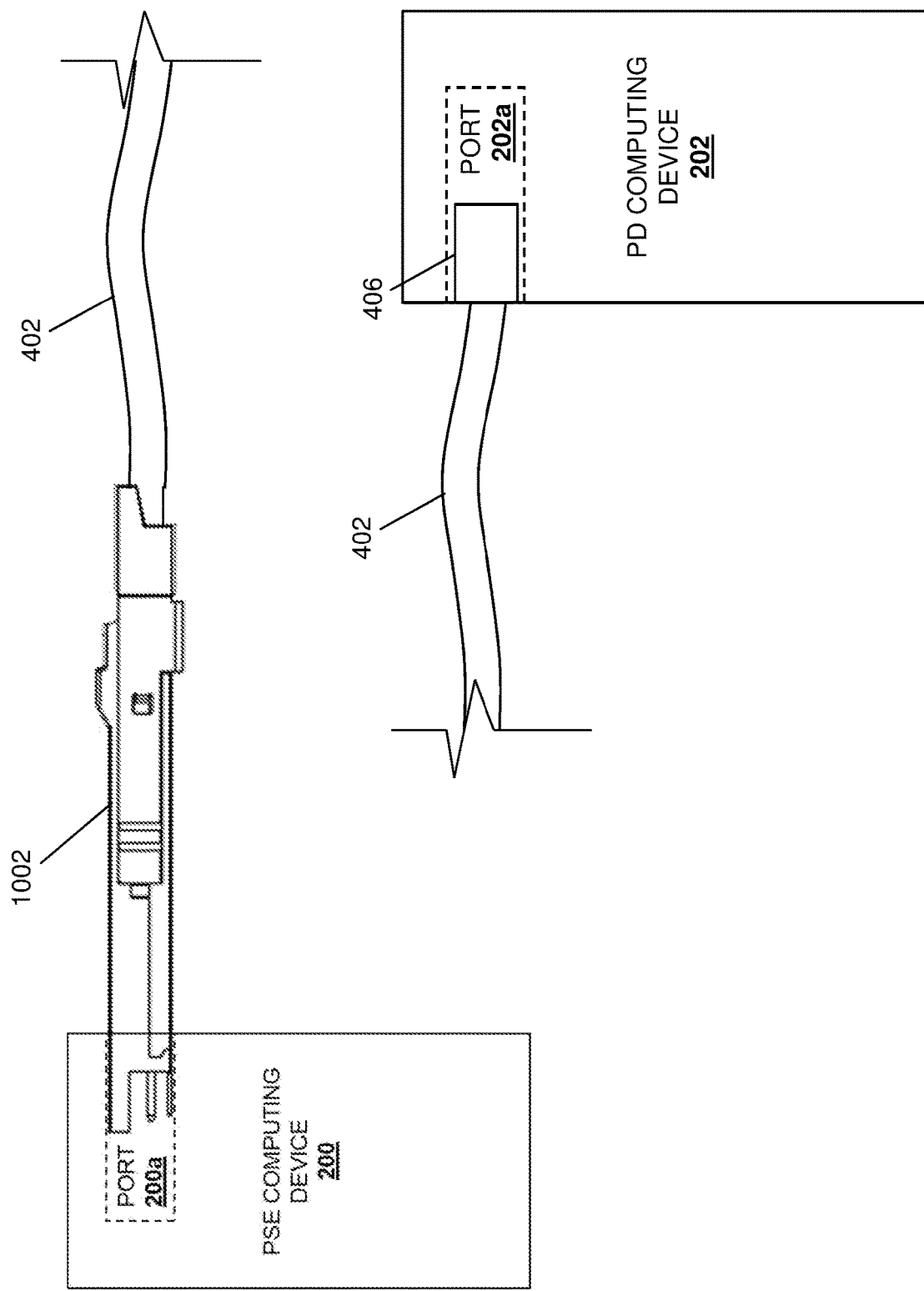
FIG. 15C is a schematic view illustrating an embodiment of the computing devices of FIG. 2 connected by the hybrid electrical/optical data/power cable of FIG. 4 and one of the hybrid electrical/optical data/power transceiver device of FIGS. 10A-10C.

As illustrated in FIG. 15C, one embodiment of the hybrid electrical/optical data/power cabling system of the present disclosure may provide the PSE computing device 200 coupled to the PD computing device 202 via the hybrid electrical/optical data/power cable 400, with the cable connector 404 on the hybrid electrical/optical data/power cable 400 connected to the hybrid electrical/optical data/power transceiver device 1000 that is further connected to the port 200a on the PSE computing device 200 (e.g., as described above with reference to FIGS. 15A and 15B), and the cable connector 404 on the hybrid electrical/optical data/power cable 400 connected to the port 202a on the PD computing device 202 (e.g., as described above with reference to FIG. 14).

Figure 15D:
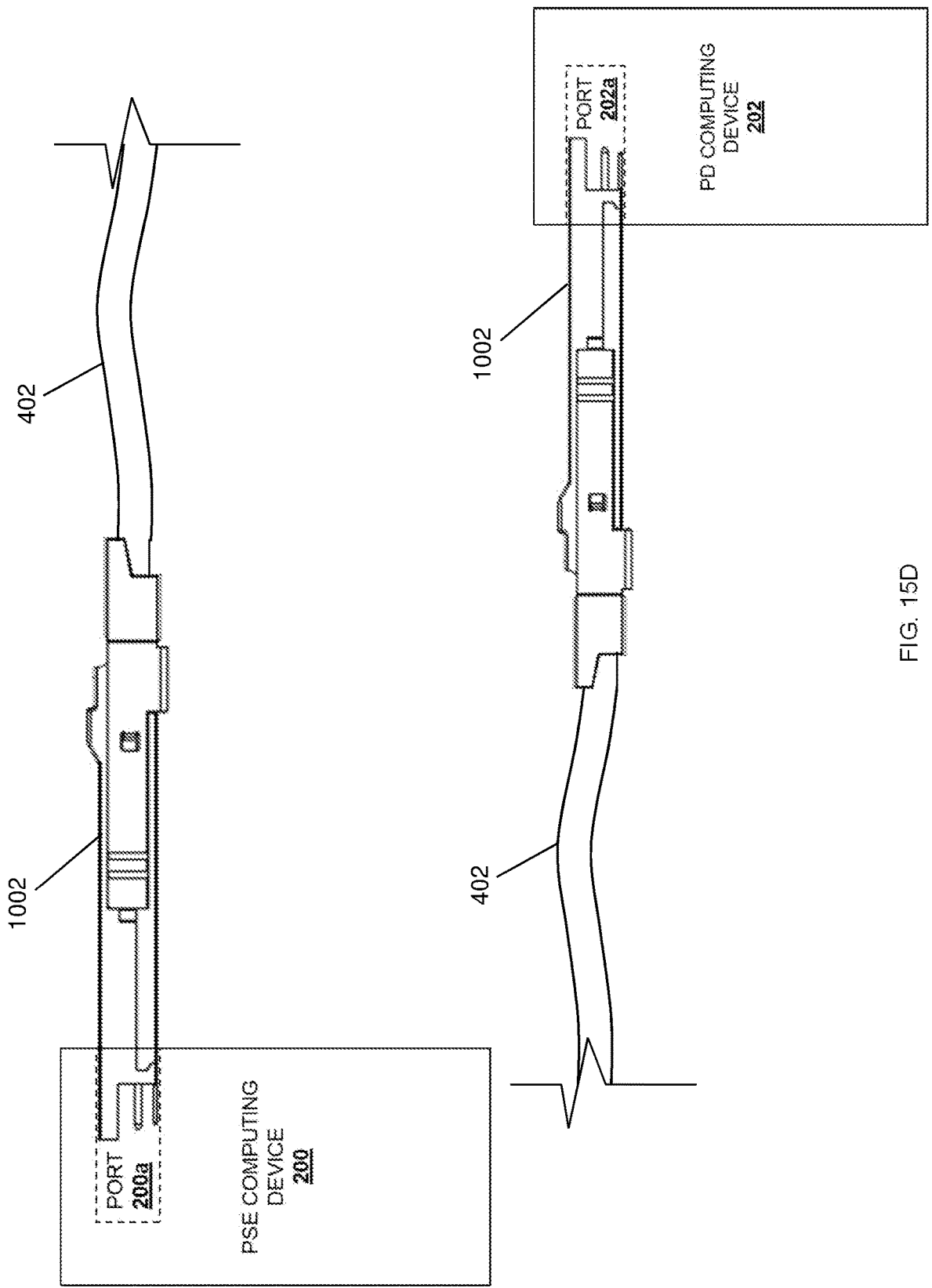
FIG. 15D is a schematic view illustrating an embodiment of the computing devices of FIG. 2 connected by the hybrid electrical/optical data/power cable of FIG. 4 and two of the hybrid electrical/optical data/power transceiver device of FIGS. 10A-10C.

As illustrated in FIG. 15D, another embodiment of the hybrid electrical/optical data/power cabling system of the present disclosure may provide the PSE computing device 200 coupled to the PD computing device 202 via the hybrid electrical/optical data/power cable 400, with the cable connector 404 on the hybrid electrical/optical data/power cable 400 connected to a first hybrid electrical/optical data/power transceiver device 1000 that is further connected to the port 200a on the PSE computing device 200 (e.g., as described above with reference to FIGS. 15A and 15B), and the cable connector 404 on the hybrid electrical/optical data/power cable 400 connected to a second hybrid electrical/optical data/power transceiver device 1000 that is further connected to the port 202a on the PD computing device 202 (e.g., as described above with reference to FIGS. 15A and 15B). However, while several different examples of the coupling of the PSE computing device 200 and the PD computing device 202 have been illustrated and described above, one of skill in the art in possession of the present disclosure will recognize that the teachings of the present disclosure may be combined in manners other that those explicitly illustrated and discussed herein while remaining within the scope of the present disclosure as well.

As will be appreciated by one of skill in the art in possession of the present disclosure, following block 1102, blocks 1104, 1106, and 1108 may be performed to transmit data between the computing devices at the substantially the same time as the performance of blocks 1110 and 1112 in order to transmit power between the computing device. Thus, while blocks 1104, 1106, and 1108 of the method 1100 are described below before blocks 1110 and 1112 of the method 1100, one of skill in the art in possession of the present disclosure will recognize that they may (and often will) be performed at the same time.

As such, following block 1102, the method 1100 then proceeds to block 1104 where the first computing device provides electrical data signals for transmission to the second computing device. In an embodiment, at block 1104, the PSE computing device 200 may provide electrical data signals for transmission to the PD computing device 202. For example, at block 1104, a processing system in the PSE computing device 200 may operate to generate electrical data signals for transmission to the PD computing device 202, and one of skill in the art in possession of the present disclosure will appreciate the wide variety of scenarios in which the processing system in a computing device may generate electrical data signals for transmission to another computing device, and any of those scenarios will fall within the scope of the present disclosure. In another example, at block 1104, the PSE computing device 200 provided by a switch device or other networking device may receive data signals from another computing device, and provide those data signals for transmission to the PD computing device 202. However, while a few specific examples have been provided, one of skill in the art in possession of the present disclosure will recognize that a PSE computing device may provide electrical data signals for transmission to a PD computing device in a variety of scenarios that will fall within the scope of the present disclosure as well.

Figure 12:
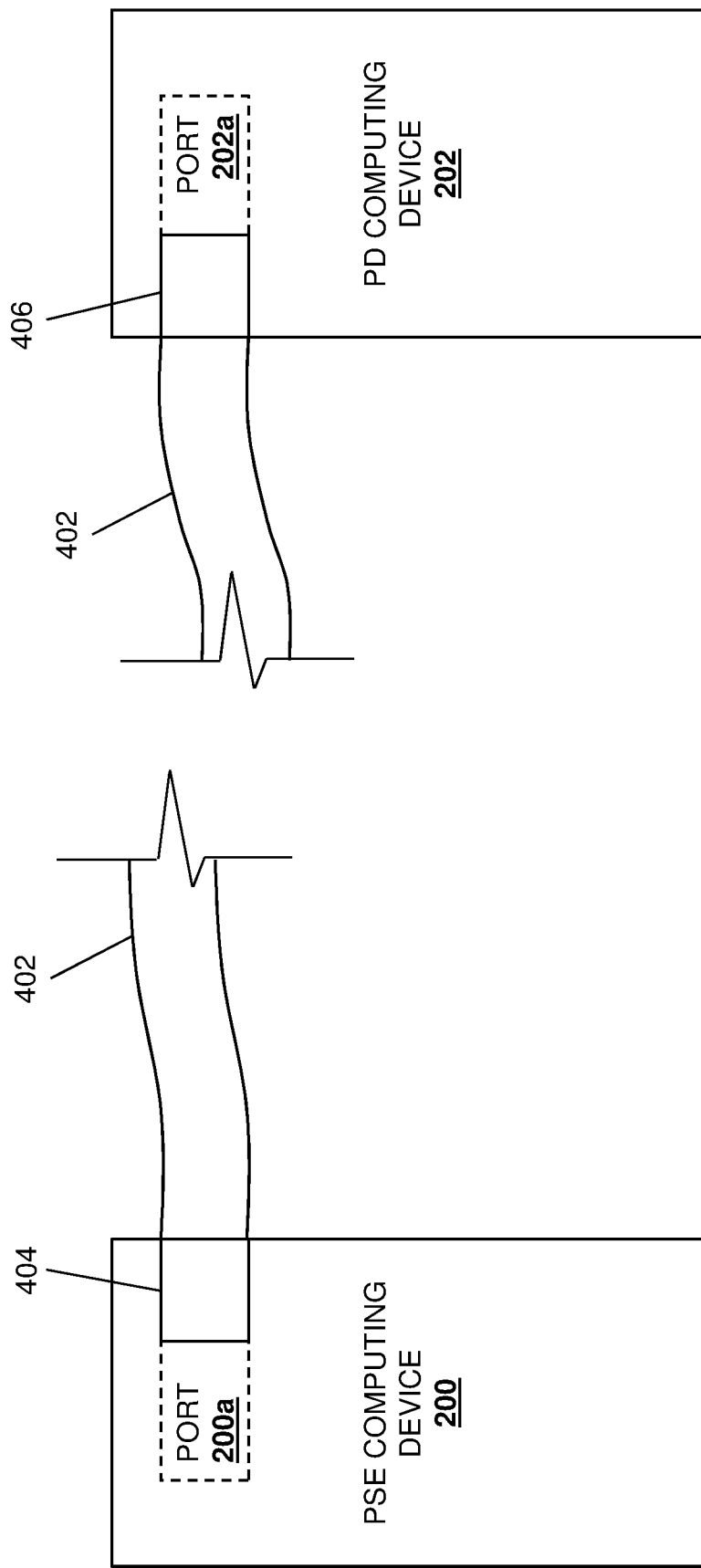
FIG. 12 is a schematic view illustrating an embodiment of the hybrid electrical/optical data/power cable of FIG. 4 connected to the computing devices of FIG. 2.

The method 1100 then proceeds to block 1106 where the electrical data signals are converted to optical data signals, and the optical data signals are transmitted to the second computing device using the hybrid electrical/optical data/power cable. With reference to FIG. 12, in an embodiment of block 1106, the electrical data signals provided by the PSE computing device 200 for transmission to the PD computing device 202 may be converted to optical data signals, and those optical data signals may be transmitted via the hybrid electrical/optical data/power cable 400 to the PD computing device 202.

With reference to the embodiment illustrated in FIG. 13, in an embodiment of block 1106, the PSE computing device 200/300 may provide the electrical data signals via the electrical signal coupling 314b to the SERDES subsystem 312, and the SERDES subsystem 312 may convert those electrical data signals to optical data signals using electrical-to-optical data signal conversion techniques that would be apparent to one of skill in the art in possession of the present disclosure. The SERDES subsystem 312 may then provide those optical data signals to a laser subsystem (not illustrated), and the laser subsystem may operate to emit (e.g., "pulse") a laser to transmit those optical data signals via the optical signal coupling 314a to one of the optical signal transmission elements 308d or 310d in the hybrid electrical/optical data/power transmission wire connector elements 308 and 310 on the hybrid electrical/optical data/power connector 306. As will be appreciated by one of skill in the art in possession of the present disclosure, one of the hybrid electrical/optical data/power transmission wires in the hybrid electrical/optical data/power cable 400 may be used by the PSE computing device 200 to transmit data, while the other of the hybrid electrical/optical data/power transmission wires in the hybrid electrical/optical data/power cable 400 may be used by the PSE computing device 200 to receive data, and thus the optical data signals may be transmitted at block 1106 based on that convention.

The one of the optical signal transmission elements 308d or 310d in the hybrid electrical/optical data/power transmission wire connector elements 308 and 310 on the hybrid electrical/optical data/power connector 306 that receives the optical data signals will transmit those optical data signals to a respective one of the optical signal transmission elements 804d or 806d in the hybrid electrical/optical data/power transmission wire connector elements 804 or 806 on the hybrid electrical/optical data/power connector 404/406/800. Furthermore, the one of the optical signal transmission elements 804d or 806d in the hybrid electrical/optical data/power transmission wire connector elements 804 or 806 on the hybrid electrical/optical data/power connector 404/406/800 that receives those optical data signals will transmit those optical data signals to the optical signal transmission layer 710 in one of the hybrid electrical/optical data/power transmission wires in the hybrid electrical/optical data/power transmission cable 400 that is being used to transmit data.

With reference to the embodiment illustrated in FIG. 14, in an embodiment of block 1106, the PSE computing device 200 may provide the electrical data signals via the electrical signal coupling 912b to the SERDES subsystem 910, and the SERDES subsystem 910 may convert those electrical data signals to optical data signals using electrical-to-optical data signal conversion techniques that would be apparent to one of skill in the art in possession of the present disclosure. The SERDES subsystem 910 may then provide those optical data signals to a laser subsystem (not illustrated), and the laser subsystem may operate to emit (e.g., "pulse") a laser to transmit those optical data signals via the optical signal coupling 912a to the optical signal transmission layer 710 in one of the hybrid electrical/optical data/power transmission wires in the hybrid electrical/optical data/power cable 900 that is being used to transmit data. As will be appreciated by one of skill in the art in possession of the present disclosure, one of the hybrid electrical/optical data/power transmission wires in the hybrid electrical/optical data/power cable 900 may be used by the PSE computing device 200 to transmit data, while the other of the hybrid electrical/optical data/power transmission wires in the hybrid electrical/optical data/power cable 900 may be used by the PSE computing device 200 to receive data, and thus the optical data signals may be transmitted at block 1106 based on that convention.

With reference to the embodiment illustrated in FIGS. 15A and 15B, in an embodiment of block 1106, the PSE computing device 200 may provide the electrical data signals via the connector 1012 on the hybrid electrical/optical data/power transceiver device 1000 such that those electrical data signals are transmitted via the electrical signal coupling 1016b to the SERDES subsystem 1014, and the SERDES subsystem 1014 may convert those electrical data signals to optical data signals using electrical-to-optical data signal conversion techniques that would be apparent to one of skill in the art in possession of the present disclosure. The SERDES subsystem 1014 may then provide those optical data signals to a laser subsystem (not illustrated), and the laser subsystem may operate to emit (e.g., "pulse") a laser to transmit those optical data signals via the optical signal coupling 1016a to one of the optical signal transmission elements 1008d or 1010d in the hybrid electrical/optical data/power transmission wire connector elements 1008 and 1010 on the hybrid electrical/optical data/power connector 1006. As will be appreciated by one of skill in the art in possession of the present disclosure, one of the hybrid electrical/optical data/power transmission wires in the hybrid electrical/optical data/power cable 400 may be used by the PSE computing device 200 to transmit data, while the other of the hybrid electrical/optical data/power transmission wires in the hybrid electrical/optical data/power cable 400 may be used by the PSE computing device 200 to receive data, and thus the optical data signals may be transmitted at block 1106 based on that convention.

The one of the optical signal transmission elements 1008d or 1010d in the hybrid electrical/optical data/power transmission wire connector elements 1008 and 1010 on the hybrid electrical/optical data/power connector 1006 that receive the optical data signals will transmit those optical data signals to a respective one of the optical signal transmission elements 804d or 806d in the hybrid electrical/optical data/power transmission wire connector elements 804 or 806 on the hybrid electrical/optical data/power connector 404/406/800. Furthermore, the one of the optical signal transmission elements 804d or 806d in the hybrid electrical/optical data/power transmission wire connector elements 804 or 806 on the hybrid electrical/optical data/power connector 404/406/800 that receives those optical data signals will transmit the optical data signals to the optical signal transmission layer 710 in one of the hybrid electrical/optical data/power transmission wires in the hybrid electrical/optical data/power transmission cable 400 that is being used to transmit data.

Once the optical data signals are received by the optical signal transmission layer 710 in one of the hybrid electrical/optical data/power transmission wires in the hybrid electrical/optical data/power transmission cable 400 that is being used to transmit data at block 1106, those optical data signals may be transmitted via that optical signal transmission layer 710 along the length of the hybrid electrical/optical data/power transmission cable 400. As such, with reference to FIGS. 5A and 5B and at block 1106, the optical data signals may be transmitted by the optical signal transmission layer 710 in one of the hybrid electrical/optical data/power transmission wires 506 or 508 and along the length of the hybrid electrical/optical data/power transmission cable 500. Similarly, with reference to FIGS. 6A and 6B and at block 1106, the optical data signals may be transmitted by the optical signal transmission layer 710 in one of the hybrid electrical/optical data/power transmission wires 606 or 608 and along the length of the hybrid electrical/optical data/power transmission cable 600.

The method 1100 then proceeds to block 1108 where the optical data signals are converted to electrical data signals, and the electrical data signals are provided to the second computing device. With reference to FIG. 12, in an embodiment of block 1108, the optical data signals transmitted via the hybrid electrical/optical data/power cable 400 may be converted to electrical data signals, and those electrical data signals may be provided to the PD computing device 202. One of skill in the art in possession of the present disclosure will recognize how, upon receiving the optical data signals, the PD computing device 202 (e.g., a processing system in the PD computing device) may utilize those optical data signals in any of a variety of manners that will fall within the scope of the present disclosure as well.

With reference to the embodiment illustrated in FIG. 13, in an embodiment of block 1108, the optical data signals transmitted via one of the hybrid electrical/optical data/power transmission wires in the hybrid electrical/optical data/power transmission cable 400 may be provided via a respective one of the optical signal transmission elements 804d or 806d in the hybrid electrical/optical data/power transmission wire connector elements 804 or 806 on the hybrid electrical/optical data/power connector 404/406/800 and to a respective one of the optical signal transmission elements 308d or 310d in the hybrid electrical/optical data/power transmission wire connector elements 308 and 310 on the hybrid electrical/optical data/power connector 306. Those optical data signals may then be provided from the one of the optical signal transmission elements 308d or 310d in the hybrid electrical/optical data/power transmission wire connector elements 308 and 310 on the hybrid electrical/optical data/power connector 306 and via the optical signal coupling 314a to the SERDES subsystem 312. The SERDES subsystem 312 may then convert those optical data signals to electrical data signals using optical-to-electrical data signal conversion techniques that would be apparent to one of skill in the art in possession of the present disclosure. The SERDES subsystem 312 may then provide those electrical data signals via the electrical signal coupling 314b to the PD computing device 202/300 (e.g., a processing system in the PD computing device 202).

With reference to the embodiment illustrated in FIG. 14, in an embodiment of block 1108, the optical data signals transmitted via one of the hybrid electrical/optical data/power transmission wires in the hybrid electrical/optical data/power transmission cable 900 may be provided via the optical signal coupling 912a to the SERDES subsystem 910. The SERDES subsystem 910 may then convert those optical data signals to electrical data signals using optical-to-electrical data signal conversion techniques that would be apparent to one of skill in the art in possession of the present disclosure. The SERDES subsystem 910 may then provide those electrical data signals via the electrical signal coupling 912b and the connector end 914 of the cable connector 904 to the PD computing device 202 (e.g., a processing system in the PD computing device 202).

With reference to the embodiment illustrated in FIGS. 15A and 15B, in an embodiment of block 1108, the optical data signals transmitted via one of the hybrid electrical/optical data/power transmission wires in the hybrid electrical/optical data/power transmission cable 400 may be provided via a respective one of the optical signal transmission elements 804d or 806d in the hybrid electrical/optical data/power transmission wire connector elements 804 or 806 on the hybrid electrical/optical data/power connector 404/406/800 and to a respective one of the optical signal transmission elements 1008d or 1010d in the hybrid electrical/optical data/power transmission wire connector elements 1008 and 1010 on the hybrid electrical/optical data/power transceiver device 1000. Those optical data signals may then be provided from the one of the optical signal transmission elements 1008d or 1010d in the hybrid electrical/optical data/power transmission wire connector elements 1008 and 1010 on the hybrid electrical/optical data/power transceiver device 1000 and via the optical signal coupling 1016a to the SERDES subsystem 1014. The SERDES subsystem 1014 may then convert those optical data signals to electrical data signals using optical-to-electrical data signal conversion techniques that would be apparent to one of skill in the art in possession of the present disclosure. The SERDES subsystem 1014 may then provide those electrical data signals via the electrical signal coupling 1016b and the connector 1012 on the hybrid electrical/optical data/power transceiver device 1000 to the PD computing device 202/300 (e.g., a processing system in the PD computing device 202).

As discussed above, blocks 1110 and 1112 of the method 1100 may be performed in order to transit power between the computing devices at substantially the same time as the performance of blocks 1104, 1106, and 1108 of the method 1100 to transmit data between the computing devices as discussed above. As such, following block 1102, the method 1100 then proceeds to block 1110 where the first computing device transmits power to the second computing device using the hybrid electrical/optical data/power cable. With reference to FIG. 12, in an embodiment of block 1110, the PSE computing device 200 may transmit power via the hybrid electrical/optical data/power cable 400 to the PD computing device 202. In an embodiment, a power subsystem (not illustrated) in the PSE computing device 200 may provide the power that is transmitted via the hybrid electrical/optical data/power cable 400 to the PD computing device 202, and that power may be provided from any of a variety of power sources that would be apparent to one of skill in the art in possession of the present disclosure.

With reference to the embodiment illustrated in FIG. 13, in an embodiment of block 1110, the PSE computing device 200/300 may provide the power via the power coupling 311 to the power transmission elements 308b and 310b in the hybrid electrical/optical data/power transmission wire connector elements 308 and 310 on the hybrid electrical/optical data/power connector 306. As will be appreciated by one of skill in the art in possession of the present disclosure, the power transmission elements 308b and 310b in the hybrid electrical/optical data/power transmission wire connector elements 308 and 310 on the hybrid electrical/optical data/power connector 306 that receive the power will transmit that power to respective power transmission elements 804b and 806b in the hybrid electrical/optical data/power transmission wire connector elements 804 or 806 on the hybrid electrical/optical data/power connector 404/406/800. Furthermore, the power transmission element 804b and 806b in the hybrid electrical/optical data/power transmission wire connector elements 804 or 806 on the hybrid electrical/optical data/power connector 404/406/800 that receive that power will transmit the power to the power transmission layer 706 in the hybrid electrical/optical data/power transmission wires in the hybrid electrical/optical data/power transmission cable 400.

With reference to the embodiment illustrated in FIG. 14, in an embodiment of block 1110, the PSE computing device 200 may provide the power via the connector end 914 of the connector 904 and through the power coupling 908 to the power transmission layer 706 in the hybrid electrical/optical data/power transmission wires in the hybrid electrical/optical data/power cable 900.

With reference to the embodiment illustrated in FIGS. 15A and 15B, in an embodiment of block 1110, the PSE computing device 200 may provide the power via the connector 1012 on the hybrid electrical/optical data/power transceiver device 1000 such that the power is transmitted via the power coupling 1013 to the power transmission elements 1008$b$ and 1010$b$ in the hybrid electrical/optical data/power transmission wire connector elements 1008 and 1010 on the hybrid electrical/optical data/power connector 1006. As will be appreciated by one of skill in the art in possession of the present disclosure, the power transmission elements 1008$b$ and 1010$b$ in the hybrid electrical/optical data/power transmission wire connector elements 1008 and 1010 on the hybrid electrical/optical data/power connector 1006 that receive the power will transmit that power to respective power transmission elements 804$b$ and 806$b$ in the hybrid electrical/optical data/power transmission wire connector elements 804 and 806 on the hybrid electrical/optical data/power connector 404/406/800. Furthermore, the power transmission elements 804$b$ and 806$b$ in the hybrid electrical/optical data/power transmission wire connector elements 804 and 806 on the hybrid electrical/optical data/power connector 404/406/800 that receive the power will transmit the power to the power transmission layer 706 in the hybrid electrical/optical data/power transmission wires in the hybrid electrical/optical data/power transmission cable 400.

Once the power is received by the power transmission layer 706 in the hybrid electrical/optical data/power transmission wires in the hybrid electrical/optical data/power transmission cable 400 at block 1108, that power may be transmitted via the power transmission layers 706 along the length of the hybrid electrical/optical data/power transmission cable 400. As such, with reference to FIGS. 5A and 5B and at block 1106, the power may be transmitted by the power transmission layer 706 in the hybrid electrical/optical data/power transmission wires 506 and 508 and along the length of the hybrid electrical/optical data/power transmission cable 500. Similarly, with reference to FIGS. 6A and 6B and at block 1106, the power may be transmitted by the power transmission layer 706 in the hybrid electrical/optical data/power transmission wires 606 and 608 and along the length of the hybrid electrical/optical data/power transmission cable 600.

The method 1100 then proceeds to block 1112 where the second computing device receives the power and provides the power to at least one component. With reference to FIG. 12, in an embodiment of block 1112, the PD computing device 202 may receive power from the PSE computing device 200 via the hybrid electrical/optical data/power cable 400, and one of skill in the art in possession of the present disclosure will appreciate how the power received via the via the hybrid electrical/optical data/power cable 400 may be used by the PD computing device 202 to power a component (e.g., an internal component, an external component, and/or any other devices or components that would be apparent to one of skill in the art in possession of the present disclosure).

With reference to the embodiment illustrated in FIG. 13, in an embodiment of block 1112, the power transmitted via the hybrid electrical/optical data/power transmission wires in the hybrid electrical/optical data/power transmission cable 400 may be provided via the respective power transmission elements 804$b$ and 806$b$ in the hybrid electrical/optical data/power transmission wire connector elements 804 and 806 on the hybrid electrical/optical data/power connector 404/406/800 to respective power transmission elements 308$b$ and 310$b$ in the hybrid electrical/optical data/power transmission wire connector elements 308 and 310 on the hybrid electrical/optical data/power connector 306. That power may then be provided from the power transmission elements 308$b$ or 310$b$ in the hybrid electrical/optical data/power transmission wire connector elements 308 and 310 on the hybrid electrical/optical data/power connector 306 and via the power coupling 311 to the PD computing device 202/300.

With reference to the embodiment illustrated in FIG. 14, the power transmitted via the hybrid electrical/optical data/power transmission wires in the hybrid electrical/optical data/power transmission cable 900 may be provided via the power coupling 908 and the connector end 914 of the cable connector 904 to the PD computing device 202.

With reference to the embodiment illustrated in FIGS. 15A and 15B, the power transmitted via the hybrid electrical/optical data/power transmission wires in the hybrid electrical/optical data/power transmission cable 400 may be provided via the respective power transmission elements 804$b$ and 806$b$ in the hybrid electrical/optical data/power transmission wire connector elements 804 and 806 on the hybrid electrical/optical data/power connector 404/406/800 to respective power transmission elements 1008$b$ and 1010$b$ in the hybrid electrical/optical data/power transmission wire connector elements 1008 and 1010 on the hybrid electrical/optical data/power connector 1006. That power may then be provided from the power transmission elements 1008$b$ or 1010$b$ in the hybrid electrical/optical data/power transmission wire connector elements 1008 and 1010 on the hybrid electrical/optical data/power connector 1006 and via the power coupling 1013 and the connector 1012 on the hybrid electrical/optical data/power transceiver device 1000 to the PD computing device 202/300.

With reference to the embodiment illustrated in FIG. 15C, the method 1100 may include the PSE computing device 200 providing the electrical data signals for transmission to the PD computing device 202 to the hybrid electrical/optical data/power transceiver device 1000 at block 1104, the electrical data signals being converted to optical data signals in the hybrid electrical/optical data/power transceiver device 1000 and the optical data signals being transmitted from the hybrid electrical/optical data/power transceiver device 1000 and through the hybrid electrical/optical data/power cable 400 to the PD computing device 202 to block 1106, and the PSE computing device 200 transmitting power via the hybrid electrical/optical data/power transceiver device 1000 and through the hybrid electrical/optical data/power cable 400 to the PD computing device at block 1108, in substantially the same manner described above with reference to FIGS. 15A and 15B.

Furthermore, with continued reference to the embodiment illustrated in FIG. 15C, the method 1100 may include the optical data signals being converted to electrical data signals in the hybrid electrical/optical data/power cable 400 and the electrical data signals being provided from the hybrid electrical/optical data/power cable 400 to the PD computing device 202 at block 1110, and the PD computing device receiving the power via the hybrid electrical/optical data/power cable 400 and providing the power to at least one component at block 1112, in substantially the same manner described above with reference to FIG. 13. Further still, with continued reference to the embodiment illustrated in FIG. 15C, the method 1100 may include the optical data signals being converted to electrical data signals in the PD computing device and the electrical data signals being provided to the PD computing device 202 at block 1110, and the PD computing device receiving the power via the hybrid electrical/optical data/power cable 400 and providing the power to at least one component at block 1112, in substantially the same manner described above with reference to FIG. 14.

With reference to the embodiment illustrated in FIG. 15D, the method 1100 may include the PSE computing device 200 providing the electrical data signals for transmission to the PD computing device 202 to the first hybrid electrical/optical data/power transceiver device 1000 at block 1104, the electrical data signals being converted to optical data signals in the first hybrid electrical/optical data/power transceiver device 1000 and the optical data signals being transmitted from the first hybrid electrical/optical data/power transceiver device 1000 and through the hybrid electrical/optical data/power cable 400 to the PD computing device 202 to block 1106, and the PSE computing device 200 transmitting power via the first hybrid electrical/optical data/power transceiver device 1000 and through the hybrid electrical/optical data/power cable 400 to the PD computing device at block 1108, in substantially the same manner described above with reference to FIGS. 15A and 15B.

Furthermore, with continued reference to the embodiment illustrated in FIG. 15D, the method 1100 may include the optical data signals being converted to electrical data signals in the second hybrid electrical/optical data/power transceiver device 1000 and the electrical data signals being provided from the second hybrid electrical/optical data/power transceiver device 1000 to the PD computing device 202 at block 1110, and the PD computing device receiving the power via the second hybrid electrical/optical data/power transceiver device 1000 and providing the power to at least one component at block 1112, in substantially the same manner described above with reference to FIGS. 15A and 15B as well.

Following either of block 1108 or block 1112, the method 1100 may then proceed to block 1114 where the second computing device provides electrical data signals for transmission to the first computing device, and then to block 1116 where the electrical data signals are converted to optical data signals and the optical data signals are transmitted to the first computing device using the hybrid electrical/optical data/power cable. In an embodiment, at blocks 1114 and 1116, the PD computing device 202 may operate to generate and/or transmit electrical data signals in substantially the same manner described above for the PSE computing device 200 with regard to block 1104, and those electrical data signals may be converted to optical data signals that are then transmitted to the PSE computing device 200 in substantially the same manner described above with regard to block 1106. As will be appreciated by one of skill in the art in possession of the present disclosure, the transmission of those optical data signals may be followed by their conversion to electrical data signals and the provisioning of those electrical data signals to the PSE computing device 200 in substantially the same manner described above with regard to block 1110. As such, the PD computing device 202 may utilize the hybrid electrical/optical data/power cable of the present disclosure to transmit data back to the PSE computing device 200.

Thus, systems and methods have been described that provide for the transmission of power and optical data between computing devices via a single, hybrid electrical/optical data/power cable. For example, the hybrid electrical/optical data/power cable may include one or more hybrid electrical/optical data/power wires that each have a power transmission element that is configured to transmit power, and an optical signal transmission element that is configured to transmit optical signals. As such, a PSE computing device may provide electrical data signals and power for transmission to a PD computing device, the electrical data signals may be converted to optical data signals, the optical data signals may be transmitted along with the power via the hybrid electrical/optical data/power cable to the PD computing device (e.g., with the power transmitted via the power transmission element(s) in the hybrid electrical/optical data/power wire(s) and the optical data signals transmitted via the optical signal transmission element(s) in the hybrid electrical/optical data/power wires.) Following their transmission via the hybrid electrical/optical data/power cable, the optical data signals may be converted to electrical data signals, and the electrical data signals may be provided along with the power to the PD computing device. The PD computing device may then utilize the electrical data signals, and provide the power to at least one component. As will be appreciated by one of skill in the art in possession of the present disclosure, the PD computing device may also provide electrical data signals for transmission to the PSE computing device, those electrical data signals may be converted to optical data signals, and those the optical data signals may be transmitted via the hybrid electrical/optical data/power cable to the PSE computing device (e.g., with the optical data signals transmitted via the optical signal transmission element(s) in the hybrid electrical/optical data/power wires). As such, a data/power transmission cable is provided that has increased data transmission bandwidth relative to conventional data/power transmission cables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hybrid electrical/optical data/power cabling system, comprising:
   a hybrid electrical/optical data/power transceiver device chassis;
   a computing device connector that is included on the hybrid electrical/optical data/power transceiver device chassis and that is configured to connect to a computing device;
   a hybrid electrical/optical data/power connector on the hybrid electrical/optical data/power transceiver device chassis that includes a first hybrid electrical/optical data/power transmission wire connector element having:
      a first power transmission element that includes a tubular power transmission element and that is configured to receive power via the computing device connector and transmit the power to a first power transmission layer in a first hybrid electrical/optical data/power wire included in a hybrid electrical/optical data/power cable that is connected to the hybrid electrical/optical data/power connector; and a first optical data signal transmission element that includes a cylindrical optical data signal transmission element that is positioned within the tubular power transmission element and that is configured to transmit optical data signals to a first optical data signal transmission layer in the first hybrid electrical/optical data/power wire included in the hybrid electrical/optical data/power cable that is connected to the hybrid electrical/optical data/power connector; and an electrical/optical data signal conversation subsystem that is included in the hybrid electrical/optical data/power transceiver device chassis and that is configured to:

receive electrical data signals via the computing device connector;

convert the electrical data signals to optical data signals; and provide the optical data signals to the first optical data signal transmission element for transmission to the first optical data signal transmission layer in the first hybrid electrical/optical data/power wire included in the hybrid electrical/optical data/power cable that is connected to the hybrid electrical/optical data/power connector.

2. The system of claim 1, further comprising:

a second hybrid electrical/optical data/power transmission wire connector element on the hybrid electrical/optical data/power connector that includes:

a second power transmission element that is configured to receive power via the computing device connector and transmit the power to a second power transmission layer in a second hybrid electrical/optical data/power wire included in the hybrid electrical/optical data/power cable that is connected to the hybrid electrical/optical data/power connector; and a second optical data signal transmission element that is configured to receive optical data signals via a second optical data signal transmission layer in the second hybrid electrical/optical data/power wire included in the hybrid electrical/optical data/power cable that is connected to the hybrid electrical/optical data/power connector, wherein the electrical/optical data signal conversation subsystem is coupled to the second optical data signal transmission element and configured to:

receive optical data signals via the second optical data signal transmission element;

convert the optical data signals to electrical data signals; and provide the electrical data signals to the computing device connector.

3. The system of claim 1, wherein the first hybrid electrical/optical data/power transmission wire connector element includes:

an insulating element located between the first power transmission element and the first optical data signal transmission element.

4. The system of claim 1, wherein the first power transmission element includes a copper material.

5. The system of claim 1, wherein the first optical data signal transmission element includes a fiber optic material.

6. An Information Handling System (IHS), comprising:

a processing system;

a port that is coupled to the processing system;

a hybrid electrical/optical data/power transceiver device that is connected to the port;

a hybrid electrical/optical data/power connector on the hybrid electrical/optical data/power transceiver device that includes a first hybrid electrical/optical data/power transmission wire connector element having:

a first power transmission element that includes a tubular power transmission element and that is configured to receive power via the port and transmit the power to a first power transmission layer in a first hybrid electrical/optical data/power wire included in a hybrid electrical/optical data/power cable that is connected to the hybrid electrical/optical data/power connector; and a first optical data signal transmission element that includes a cylindrical optical data signal transmission element that is positioned within the tubular power transmission element and that is configured to transmit optical data signals to a first optical data signal transmission layer in the first hybrid electrical/optical data/power wire included in the hybrid electrical/optical data/power cable that is connected to the hybrid electrical/optical data/power connector; and an electrical/optical data signal conversation subsystem that is included in the hybrid electrical/optical data/power transceiver device and that is configured to:

receive electrical data signals from the processing system via the port;

convert the electrical data signals to optical data signals; and provide the optical data signals to the first optical data signal element for transmission to the first optical data signal transmission layer in the first hybrid electrical/optical data/power wire included in the hybrid electrical/optical data/power cable that is connected to the hybrid electrical/optical data/power connector.

7. The IHS of claim 6, further comprising:

a second hybrid electrical/optical data/power transmission wire connector element on the hybrid electrical/optical data/power connector that includes:

a second power transmission element that is configured to receive power via the port and transmit the power to a second power transmission layer in a second hybrid electrical/optical data/power wire included in the hybrid electrical/optical data/power cable that is connected to the hybrid electrical/optical data/power connector; and a second optical data signal transmission element that is configured to receive optical data signals via a second optical data signal transmission layer in the second hybrid electrical/optical data/power wire included in the hybrid electrical/optical data/power cable that is connected to the hybrid electrical/optical data/power connector, wherein the electrical/optical data signal conversation subsystem is coupled to the second optical data signal transmission element and configured to:

receive optical data signals via the second optical data signal transmission element;

convert the optical data signals to electrical data signals; and provide the electrical data signals to the processing system via the port.

8. The IHS of claim 7, wherein the first hybrid electrical/optical data/power transmission wire connector element includes:
an insulating element located between the first power transmission element and the first optical data signal transmission element.

9. The IHS of claim 6, wherein the first power transmission element includes a copper material.

10. The IHS of claim 6, wherein the first optical data signal transmission element includes a fiber optic material.

11. The IHS of claim 6, wherein the electrical/optical data signal conversation subsystem includes a serializer/deserializer subsystem and a laser subsystem.

12. A method for transmitting data and power, comprising:
transmitting, via a first power transmission element that includes a tubular power transmission element and that is provided in a first hybrid electrical/optical data/power transmission wire connector element on a hybrid electrical/optical data/power connector included on a hybrid electrical/optical data/power transceiver device, power received via a port to which the hybrid electrical/optical data/power transceiver device is connected to a first power transmission layer in a first hybrid electrical/optical data/power wire included in a hybrid electrical/optical data/power cable that is connected to the hybrid electrical/optical data/power connector;
receiving, by an electrical/optical data signal conversion subsystem in the hybrid electrical/optical data/power transceiver device via the port to which the hybrid electrical/optical data/power transceiver device is connected, electrical data signals;
converting, by the electrical/optical data signal conversion subsystem in the hybrid electrical/optical data/power transceiver device, the electrical data signals to optical data signals; and
transmitting, via a first optical data signal transmission element that includes a cylindrical optical data signal transmission element that is positioned within the tubular power transmission element and that is provided in the first hybrid electrical/optical data/power transmission wire connector element on the hybrid electrical/optical data/power connector included on the hybrid electrical/optical data/power transceiver device, the optical data signals to a first optical data signal transmission layer in the first hybrid electrical/optical data/power wire included in the hybrid electrical/optical data/power cable that is connected to the hybrid electrical/optical data/power connector.

13. The method of claim 12, further comprising:
transmitting, via a second power transmission element in a second hybrid electrical/optical data/power transmission wire connector element on the hybrid electrical/optical data/power connector included on the hybrid electrical/optical data/power transceiver device, power received via the port to which the hybrid electrical/optical data/power transceiver device is connected to a second power transmission layer in a second hybrid electrical/optical data/power wire included in the hybrid electrical/optical data/power cable that is connected to the hybrid electrical/optical data/power connector;
receiving, by the electrical/optical data signal conversion subsystem in the hybrid electrical/optical data/power transceiver device via a second optical data signal transmission element in a second hybrid electrical/optical data/power transmission wire connector element on the hybrid electrical/optical data/power connector included on the hybrid electrical/optical data/power transceiver device, optical data signals transmitted via a second optical data signal transmission layer in a second hybrid electrical/optical data/power wire included in the hybrid electrical/optical data/power cable that is connected to the hybrid electrical/optical data/power connector;
converting, by the electrical/optical data signal conversion subsystem in the hybrid electrical/optical data/power transceiver device, the optical data signals to electrical data signals; and
transmitting, via the port to which the hybrid electrical/optical data/power transceiver device is connected, the electrical data signals.

14. The method of claim 12, wherein the first hybrid electrical/optical data/power transmission wire connector element includes:
an insulating element located between the first power transmission element and the first optical data signal transmission element.

15. The method of claim 12, wherein the first power transmission element includes a copper material.

16. The method of claim 12, wherein the first optical data signal transmission element includes a fiber optic material.

17. The method of claim 12, wherein the electrical/optical data signal conversation subsystem includes a serializer/deserializer subsystem and a laser subsystem.

* * * * *